(12) United States Patent
Suzuki

(10) Patent No.: US 10,268,026 B2
(45) Date of Patent: Apr. 23, 2019

(54) OPTICAL SYSTEM, OPTICAL APPARATUS AND METHOD FOR MANUFACTURING THE OPTICAL SYSTEM

(71) Applicant: Nikon Corporation, Tokyo (JP)

(72) Inventor: Atsushi Suzuki, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/381,277

(22) PCT Filed: Feb. 26, 2013

(86) PCT No.: PCT/JP2013/001081
§ 371 (c)(1),
(2) Date: Aug. 27, 2014

(87) PCT Pub. No.: WO2013/128882
PCT Pub. Date: Sep. 6, 2013

(65) Prior Publication Data
US 2015/0085377 A1   Mar. 26, 2015

(30) Foreign Application Priority Data

Feb. 28, 2012  (JP) ................ 2012-042330
Mar. 7, 2012  (JP) ................ 2012-050009

(51) Int. Cl.
*G02B 15/14* (2006.01)
*G02B 13/04* (2006.01)
(Continued)

(52) U.S. Cl.
CPC ......... *G02B 13/04* (2013.01); *G02B 13/0045* (2013.01); *G02B 13/18* (2013.01); *Y10T 29/49826* (2015.01)

(58) Field of Classification Search
CPC ................................. G02B 15/161
(Continued)

(56) References Cited

U.S. PATENT DOCUMENTS 4,986,642 A    1/1991  Yokota et al.
5,828,499 A *  10/1998 Ohtake ............ G02B 15/173
                                                359/554
(Continued)

FOREIGN PATENT DOCUMENTS

EP    2 477 053 A1   7/2012
JP    46-004735 A    2/1971
(Continued)

OTHER PUBLICATIONS

Hecht, Eugene. "More on Geometrical Optics." pp. 244 and 246, Optics. Fourth ed. San Francisco: Addison Wesley, 2002. Print.*
(Continued)

*Primary Examiner* — Stephone B Allen
*Assistant Examiner* — Travis Fissel
(74) *Attorney, Agent, or Firm* — Shapiro, Gabor and Rosenberger, PLLC

(57) ABSTRACT

Provided is an optical system having, in order from an Object, a first lens group (G1) having negative refractive power and a second lens group (G2), wherein the first lens group (G1) includes, in order from the object, a first negative lens (L11) and a second negative lens (L12) having a concave surface facing the object, and the following conditional expression (1) is satisfied:

$$7.94 \leq (-fn12)/f < 48.00 \quad (1)$$

where fn12 denotes a focal length of the second negative lens (L12), and f denotes a focal length of the entire optical system.

4 Claims, 36 Drawing Sheets

(EXAMPLE 1)

(51) Int. Cl.
*G02B 13/18* (2006.01)
*G02B 13/00* (2006.01)

(58) Field of Classification Search
USPC ....... 359/681, 682, 680, 752, 751, 749, 691, 359/750
See application file for complete search history.

(56) References Cited

U.S. PATENT DOCUMENTS

| | | | |
|---|---|---|---|
| 6,038,081 A * | 3/2000 | Sato ................. | G02B 13/18 359/676 |
| 6,043,939 A * | 3/2000 | Toyama ............. | G02B 15/163 359/676 |
| 6,236,517 B1 * | 5/2001 | Kato ................. | G02B 15/177 359/676 |
| 7,471,465 B2 | 12/2008 | Yamashita et al. | |
| 7,545,581 B2 * | 6/2009 | Kawakami .......... | G02B 15/177 359/680 |
| 7,907,351 B2 * | 3/2011 | Tomioka ............ | G02B 15/177 359/680 |
| 2001/0033427 A1 * | 10/2001 | Toyama ............. | G02B 15/177 359/680 |
| 2002/0018302 A1 * | 2/2002 | Nishimura .......... | G02B 15/177 359/686 |
| 2002/0141072 A1 | 10/2002 | Moskovich | |
| 2008/0130128 A1 | 6/2008 | Yamashita et al. | |
| 2009/0141368 A1 * | 6/2009 | Iyama ................ | G02B 13/18 359/717 |
| 2009/0161229 A1 * | 6/2009 | Shimada ............. | G02B 15/177 359/689 |
| 2009/0244719 A1 * | 10/2009 | Nakamura .......... | G02B 15/177 359/684 |
| 2010/0149073 A1 * | 6/2010 | Chaum .............. | G02B 27/0093 345/8 |
| 2012/0057251 A1 | 3/2012 | Takato | |
| 2013/0162886 A1 | 6/2013 | Morooka et al. | |

FOREIGN PATENT DOCUMENTS

| | | |
|---|---|---|
| JP | 01-200316 A | 8/1989 |
| JP | 04-204615 A | 7/1992 |
| JP | 07-063991 A | 3/1995 |
| JP | 2002-014284 A | 1/2002 |
| JP | 2004-522187 A | 7/2004 |
| JP | 2007-025499 A | 2/2007 |
| JP | 2008-040033 A | 2/2008 |
| JP | 2008-309991 A | 12/2008 |
| JP | 2011-059494 A | 3/2011 |
| JP | 2011-059496 A | 3/2011 |
| JP | 2013-125213 A | 6/2013 |
| JP | 2013-130820 A | 7/2013 |
| WO | WO 02/071124 A1 | 9/2002 |
| WO | WO 2011/070930 A1 | 6/2011 |

OTHER PUBLICATIONS

Office Action dated Jun. 28, 2017, in Chinese Patent Application No. 201380011464.6.
English Translation of "Written Opinion of the International Searching Authority" for PCT/JP2013/001081, dated Jun. 4, 2013.
International Search Report from International Patent Application No. PCT/JP2013/001081, dated Jun. 4, 2013.
Examination Report dated Sep. 17, 2018 in Indian Patent Application No. 7946/DELNP/2014.
English translation of Office Action dated Mar. 9, 2018 in Chinese Patent Application No. 201380011464.6.

* cited by examiner (EXAMPLE 1)

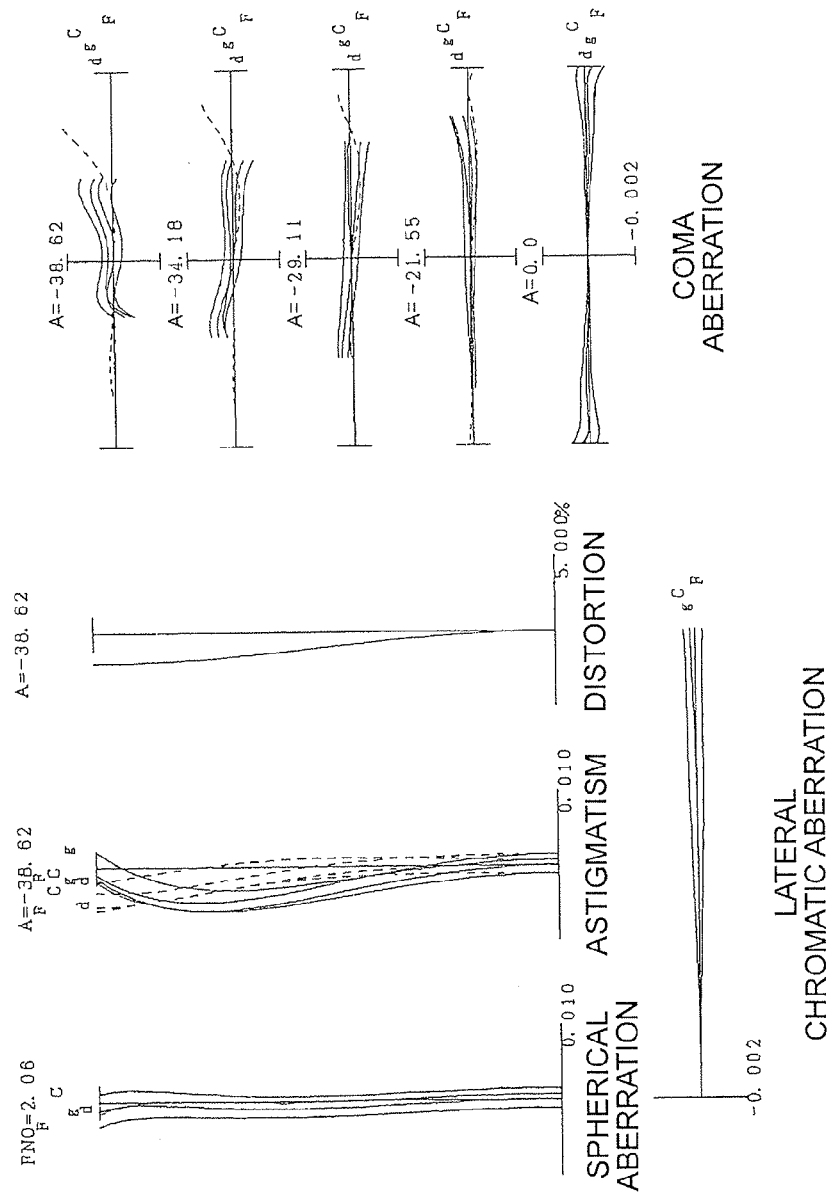

(EXAMPLE 2)

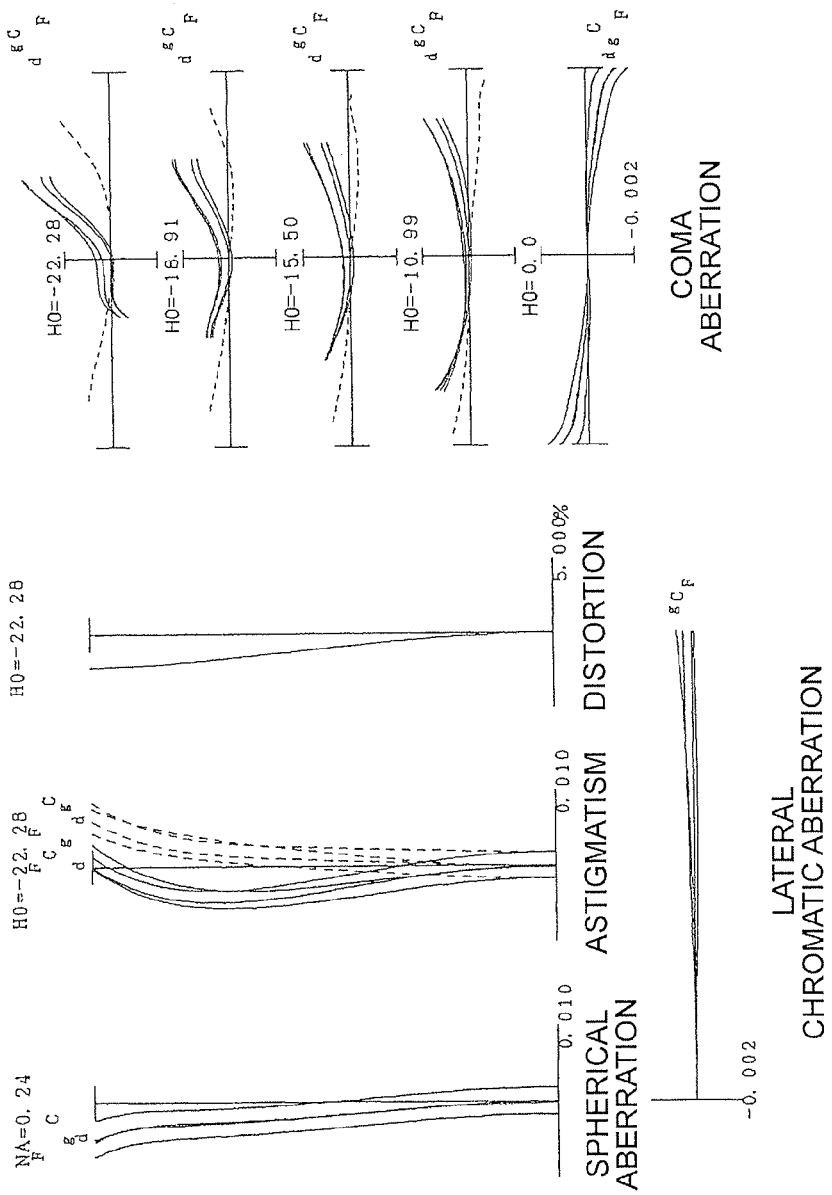

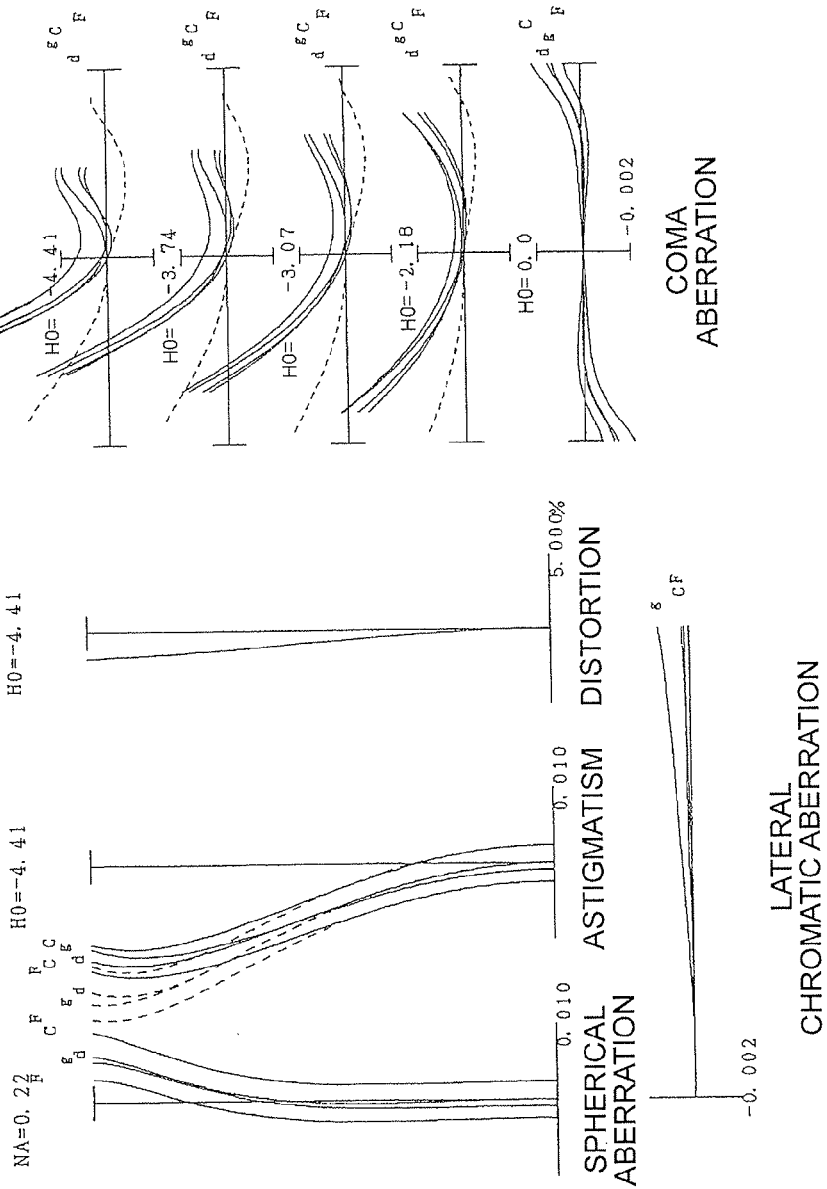

(EXAMPLE 3)

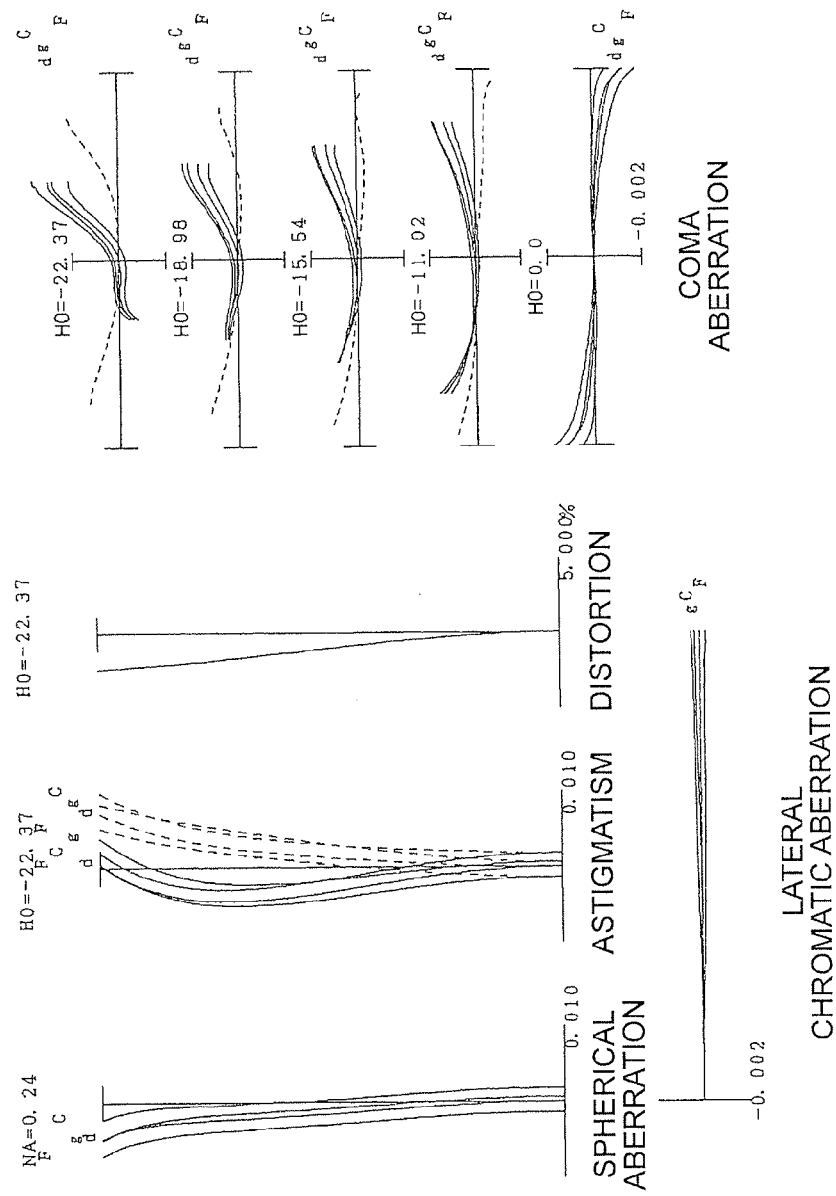

(EXAMPLE 4)

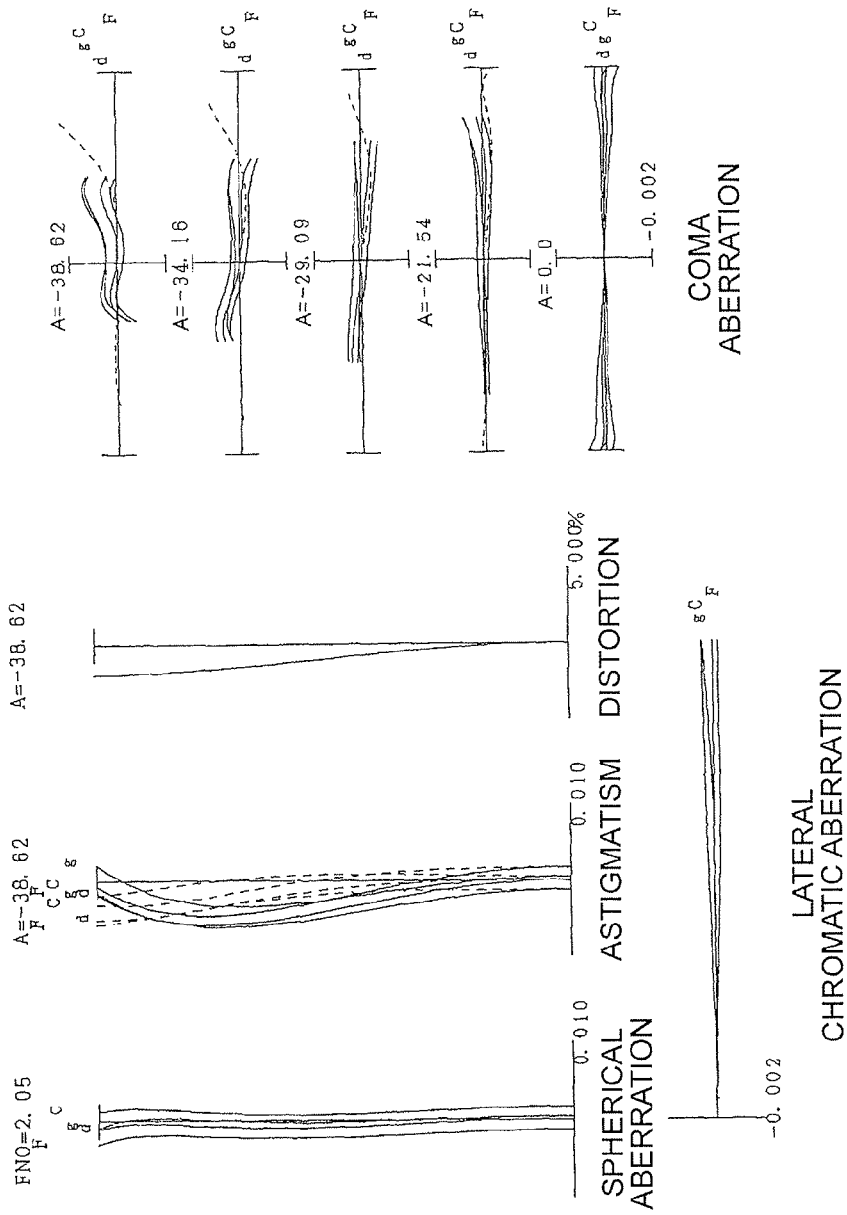

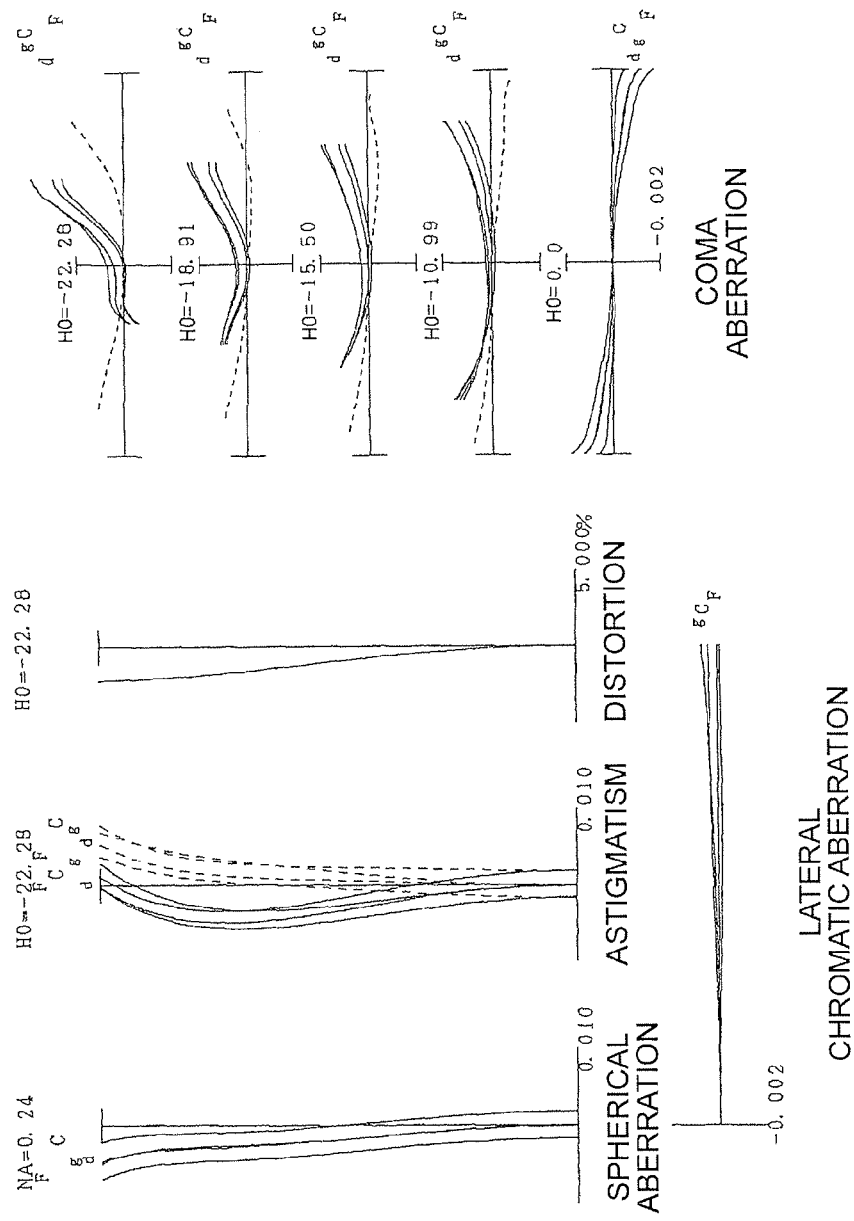

(EXAMPLE 5)

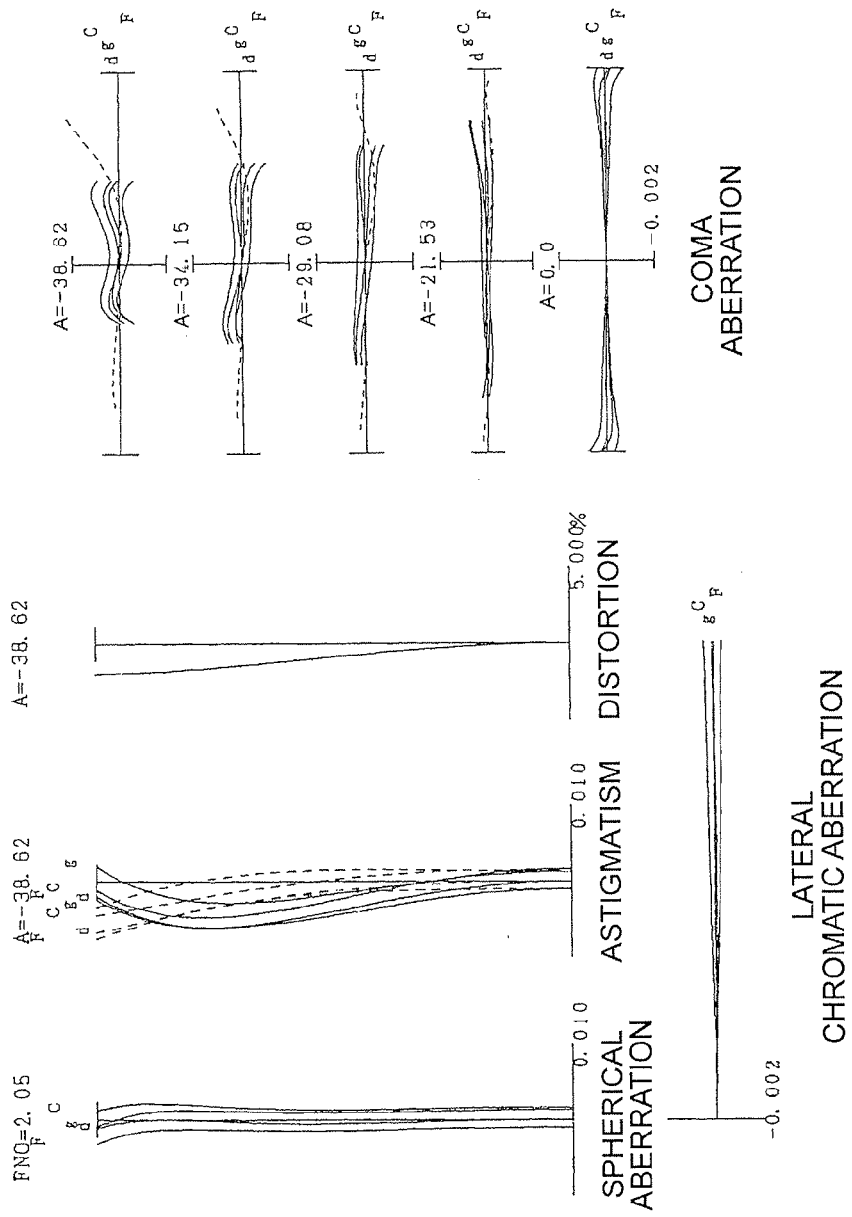

(EXAMPLE 6)

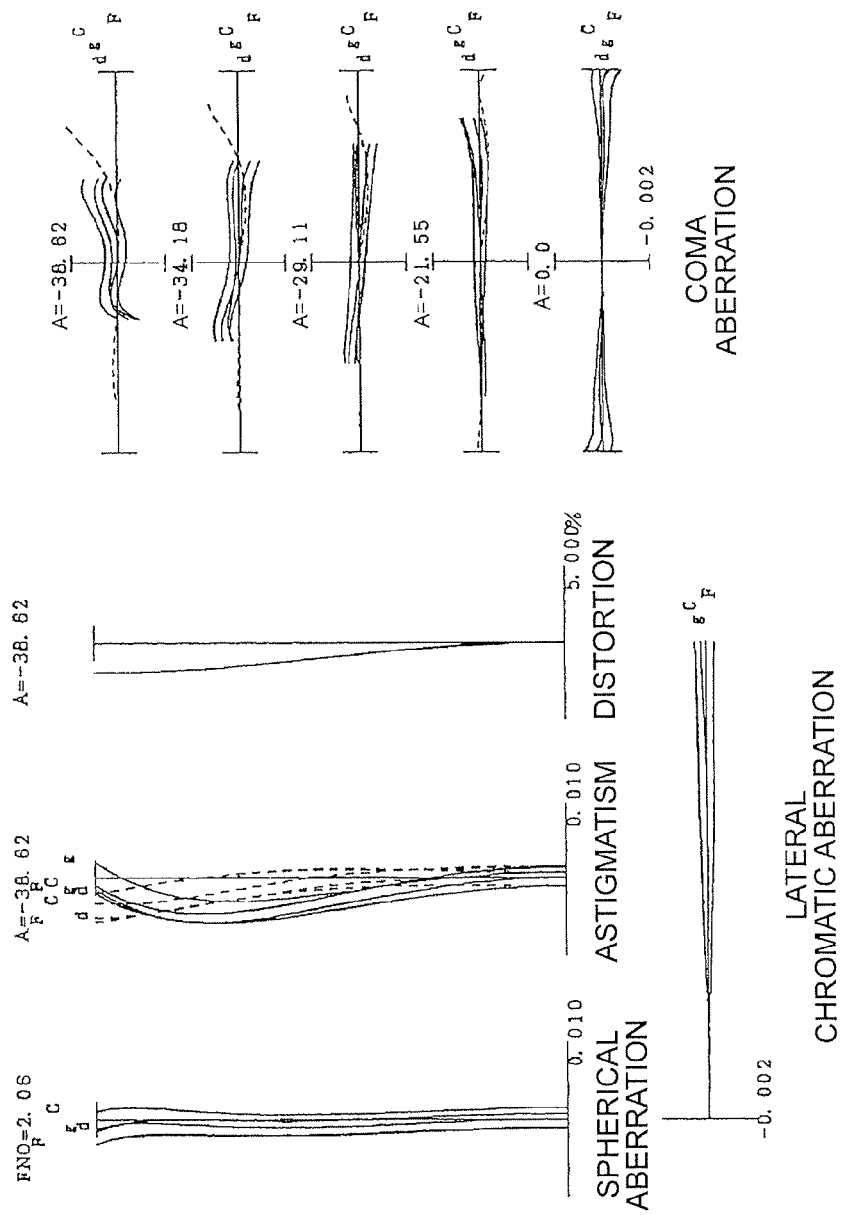

(EXAMPLE 7)

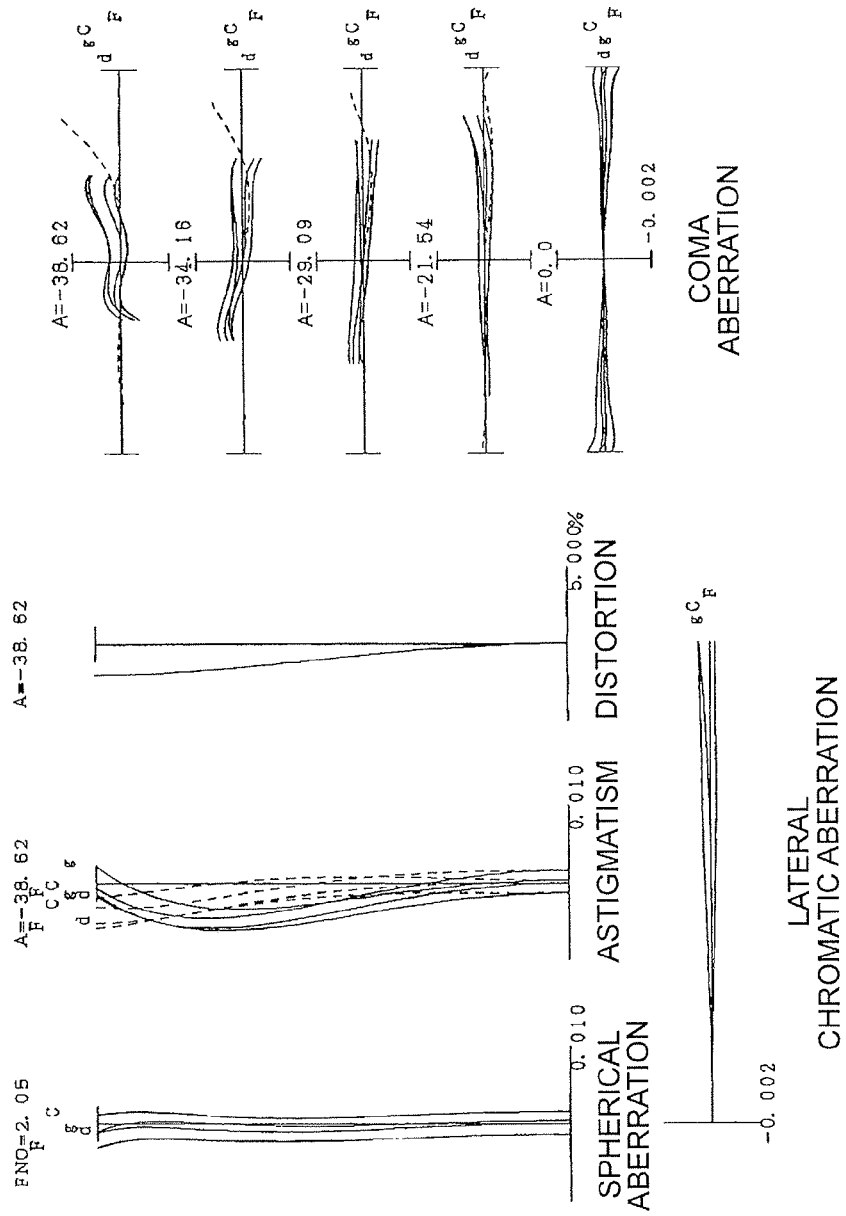

(EXAMPLE 8)

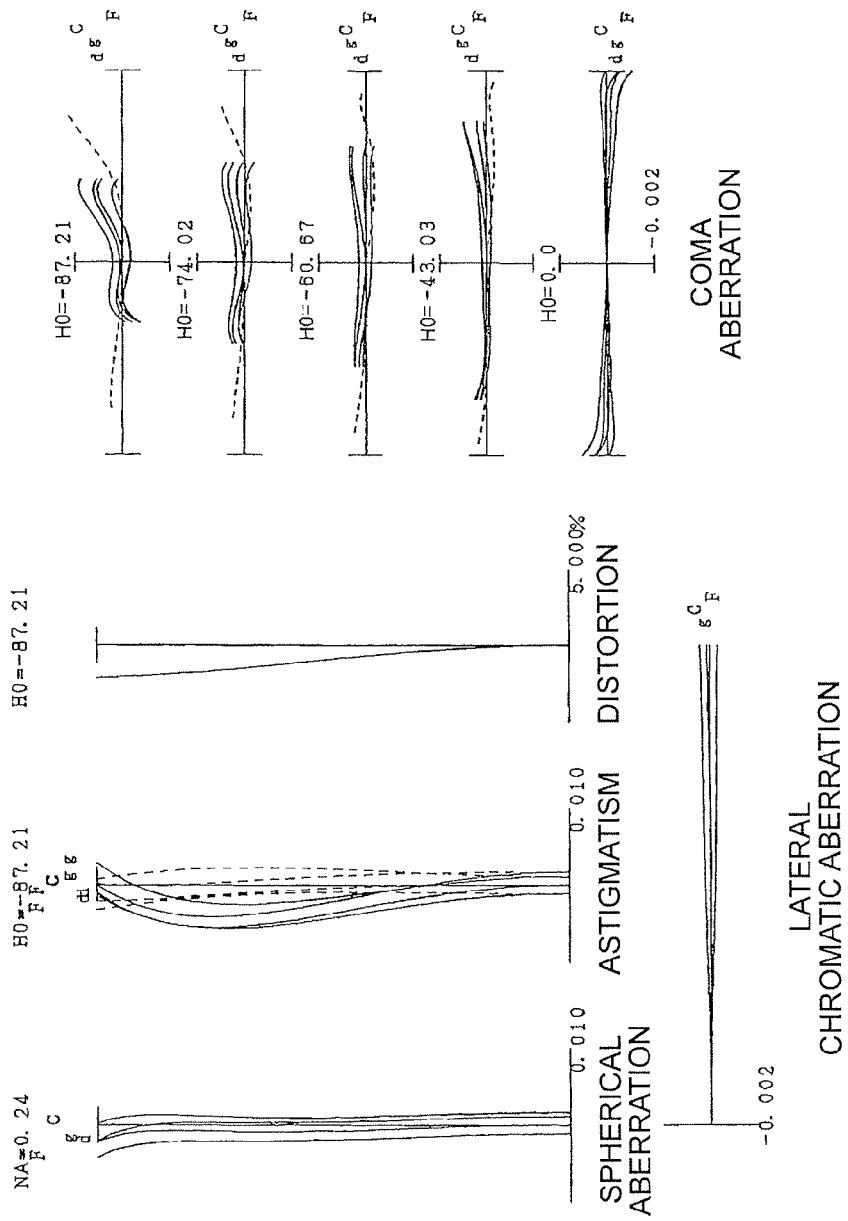

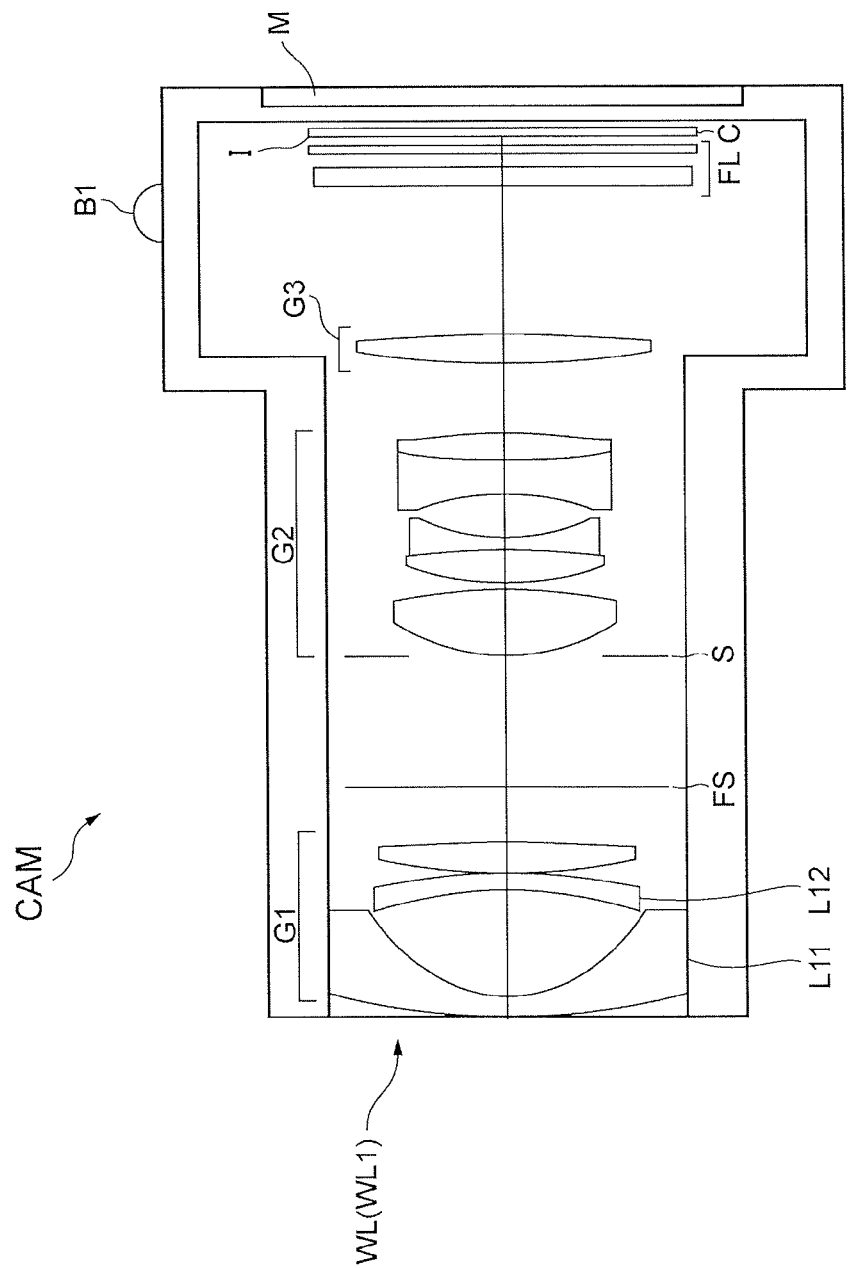

OPTICAL SYSTEM, OPTICAL APPARATUS AND METHOD FOR MANUFACTURING THE OPTICAL SYSTEM

TECHNICAL FIELD

The present invention relates to an optical system having a wide angle and large aperture that is suitable for an imaging optical system of a digital camera, film camera, video camera or the like.

TECHNICAL BACKGROUND

A main stream of zoom lenses of compact digital cameras currently available includes a type where the lens barrel collapses into the camera when the camera is not used. This type where the lens barrel collapses into the camera when the camera is not used has been proposed not only for a zoom lens, but also for a wide angle lens with a fixed focal point, of which focal length, with respect to an infinite object point, does not change (e.g. see Patent Document 1).

PRIOR ARTS LIST

Patent Document

Patent Document 1: Japanese Laid-Open Patent Publication No. 2008-40033(A)

SUMMARY OF THE INVENTION

Problems to be Solved by the Invention

A conventional wide angle lens with a fixed focal point is compact and has a wide angle of view, but has about a 4.0 Fno, which is dark.

With the foregoing in view, it is an object of the present invention to provide an optical system and an optical apparatus of which the lens barrel can collapse into a camera when the camera is not used, and which still has a small size, a wide angle of view and a large aperture, and a method for manufacturing the optical system.

Means to Solve the Problems

To achieve this object, an optical system according to this invention has, in order from an object, a first lens group having negative refractive power; and a second lens group, wherein the first lens group includes, in order from the object, a first negative lens and a second negative lens having a concave surface facing the object, and the following conditional expression is satisfied.

$$7.94 \leq (-fn12)/f < 48.00$$

where fn12 denotes a focal length of the second negative lens, and f denotes a focal length of the entire optical system.

In the optical system according to this invention, it is preferable that the first lens group includes, in order from the object, the first negative lens, the second negative lens and a positive lens.

In the optical system according to this invention, it is preferable that the following conditional expression is satisfied.

$$-30.00 < vp13 - vn12 < 30.00$$

where vp13 denotes an Abbe number of the positive lens with respect to the d-line, and vn12 denotes an Abbe number of the second negative lens with respect to the d-line.

In the optical system according to this invention, it is preferable that the second negative lens is a meniscus lens.

In the optical system according to this invention, it is preferable that the first negative lens, the second negative lens and the positive lens are all single lenses.

In the optical system according to this invention, it is preferable that the second lens group has positive refractive power.

In the optical system according to this invention, it is preferable that an aperture stop is disposed closer to the object than the second lens group.

In the optical system according to this invention, it is preferable that at least one surface of the first negative lens is aspherical.

An optical apparatus according to this invention includes one of the above optical systems.

A method for manufacturing an optical system according to this invention is a method for manufacturing an optical system having, in order from an object, a first lens group having negative refractive power and a second lens group, wherein the first lens group includes, in order from the object, a first negative lens and a second negative lens having a concave surface facing the object, and each lens is assembled in a lens barrel such that the following conditional expression is satisfied.

$$7.94 \leq (-fn12)/f < 48.00$$

where fn12 denotes a focal length of the second negative lens, and f denotes a focal length of the entire optical system.

An optical system according to this invention has, in order from an object: a first lens group having negative refractive power; and a second lens group, wherein the first lens group includes, in order from the object, a first lens having negative refractive power, a second lens which has a concave surface facing the object and has negative refractive power, and a third lens, and the following conditional expression is satisfied.

$$-23.0 < vd3 - vd2 < 24.2$$

where vd3 denotes an Abbe number of the third lens with respect to the d-line, and vd2 denotes an Abbe number of the second lens with respect to the d-line.

In the optical system according to this invention, it is preferable that the following conditional expression is satisfied.

$$fL1/FL2 < 0.2$$

where fL1 denotes a focal length of the first lens, and fL2 denotes a focal length of the second lens.

In the optical system according to this invention, it is preferable that the following conditional expression is satisfied.

$$2.55 < (-R21)/R12$$

where R21 denotes a radius of curvature of the object side surface of the second lens, and R12 denotes a radius of curvature of an image side surface of the first lens, and the radius of curvatures R21 and R12 are positive when the convex surface faces the object.

In the optical system according to this invention, it is preferable that the third lens has positive refractive power.

In the optical system according to this invention, it is preferable that the first lens, the second lens and the third lens are all single lenses.

In the optical system according to this invention, it is preferable that the second lens group has positive refractive power.

In the optical system, according to this invention, it is preferable that an aperture stop is disposed closer to the object than the second lens group.

In the optical system according to this invention, it is preferable that at least one surface of the first lens is aspherical.

An optical apparatus according to this invention includes one of the above optical systems.

A method for manufacturing an optical system according to this invention is a method for manufacturing an optical system having, in order from an object, a first lens group having negative refractive power and a second lens group, wherein the first lens group includes, in order from the object, a first lens having negative refractive power, a second lens which has a concave surface facing the object and has negative refractive power, and a third lens, and each lens is assembled in a lens barrel such that the following conditional expression is satisfied.

$$-23.0 < vd3 - vd2 < 24.2$$

where vd3 denotes an Abbe number of the third lens with respect to the d-line, and vd2 denotes an Abbe number of the second lens with respect to the d-line.

Advantageous Effects of the Invention

This invention can provide an optical system and an optical apparatus of which lens barrel can collapse into the camera when the camera is not used, and which still has a small size, a wide angle of view and a large aperture, and a method for manufacturing the optical system.

BRIEF DESCRIPTION OF THE DRAWINGS

FIG. 1 are cross-sectional views depicting a configuration of an optical system according to Example 1, where

FIG. 2 are graphs showing various aberrations of the optical system according to Example 1, where FIG. 2A shows an aberration upon focusing on infinity ($\beta=0.0000$)

FIG. 3 are cross-sectional views depicting a configuration of an optical system according to Example 2, where

FIG. 4 are graphs showing various aberrations of the optical system according to Example 2, where FIG. 4B shows an aberration upon focusing on a point at an intermediate distance ($\beta=-0.0359$), and FIG. 4C shows an aberration upon focusing on a nearest point ($\beta=-0.1808$);

FIG. 5 are cross-sectional views depicting a configuration of an optical system according to Example 3, where

FIG. 6 are graphs showing various aberrations of the optical system according to Example 3, where FIG. 6B shows an Aberration upon focusing on a point at an intermediate distance ($\beta=-0.0358$)

FIG. 7 are cross-sectional views depicting a configuration of an optical system according to Example 4, where

FIG. 8 are graphs showing various aberrations of the optical system according to Example 4, where FIG. 8A shows an Aberration upon focusing on infinity ($\beta=0.000$), FIG. 8C shows an aberration upon focusing on a nearest point ($\beta=-0.036$);

FIG. 9 are cross-sectional views depicting a configuration of an optical system according to Example 5, where

FIG. 10 are graphs showing various aberrations of the optical system according to Example 5, where FIG. 10A shows an aberration upon focusing on infinity ($\beta=0.000$)

FIG. 12 are cross-sectional views depicting a configuration of an optical system according to Example 6, where

FIG. 13 are graphs showing various aberrations of the optical system according to Example 6, where FIG. 13A shows an aberration upon focusing on infinity ($\beta=0.000$)

FIG. 14 are cross-sectional views depicting a configuration of an optical system according to Example 7, where

FIG. 15 are graphs showing various aberrations of the optical system according to Example 7, where FIG. 15A shows an aberration upon focusing on infinity ($\beta=0.000$)

FIG. 16 are cross-sectional views depicting a configuration of an optical system according to Example 8, where

FIG. 17 are graphs showing various aberrations of the optical system according to Example 8, where FIG. 17B shows an aberration upon focusing on a point at an intermediate distance (β=−0.009)

FIG. 19 shows a digital camera (optical apparatus) including the optical system according to Example 1, where FIG. 20 is a cross-sectional view along the A-A' line in FIG. 19A.

DESCRIPTION OF THE EMBODIMENTS

Embodiments of the present invention will now be described with reference to the drawings. Embodiment 1 of the present invention will be described first with reference to FIG. 1 to FIG. 11. Then Embodiment 2 of the present invention will be described with reference to FIG. 12 to FIG. 18. Finally optical apparatuses according to these embodiments will be described with reference to FIG. 19 and FIG. 20

(Embodiment 1)

Figure 1A:
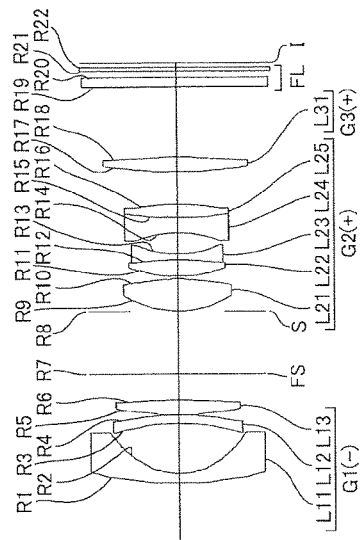
FIG. 1A shows an arrangement upon focusing on infinity ($\beta=0.0000$)
Figure 1B:
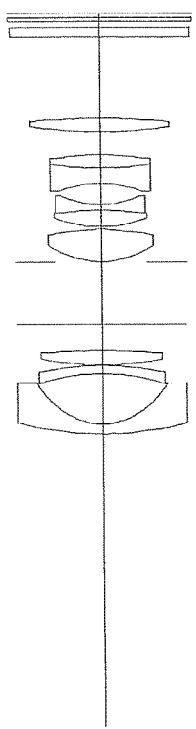
FIG. 1B shows an arrangement upon focusing on a point at an intermediate distance ($\beta=-0.0359$)
Figure 1C:
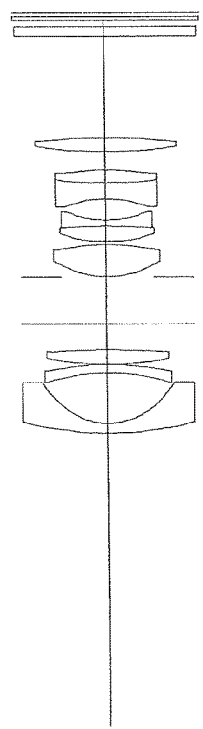
FIG. 1C shows an arrangement upon focusing on a nearest point ($\beta=-0.1790$)

As illustrated in FIG. 1, an optical system according to Embodiment 1 has, in order from an object, a first lens group G1 having negative refractive power, and a second lens group G2, wherein the first lens group G1 includes, in order from the object, a first negative lens L11, and a second negative lens L12 having a concave surface facing the object, and the following conditional expression (1) is satisfied.

$$7.94 \le (-fn12)/f < 48.00 \quad (1)$$

where fn12 denotes a focal length of the second negative lens L12, and f denotes a focal length of the entire optical system.

Generally in the design of an imaging optical system, such as a photograph lens, it is difficult to make the angle of view wider and the aperture larger without changing the size of the optical system very much. As the aperture becomes larger, it becomes more difficult to correct spherical aberration, to correct both the meridional coma aberration and the sagittal coma aberration, and to correct both coma aberration and astigmatism. If the angle of view is made wider without increasing the size of the optical system, it becomes difficult to correct spherical aberration, astigmatism and various chromatic aberrations. However in the case of the optical system having the above configuration according to this embodiment, the lens barrel can collapse in the camera when the camera is not used, but the camera can be compact. Further, while implementing a large aperture of about Fno 2.0 and a wide angle of view of about 75°, the sagittal coma aberration can be decreased without worsening the meridional coma aberration.

The conditional expression (1) specifies the focal length of the second negative lens L12 constituting the first lens group G1. By satisfying the conditional expression (1), sagittal coma aberration can be decreased without worsening the meridional coma Aberration. If the upper limit value of conditional expression (1) is exceeded, the absolute value of the refractive power of the second negative lens L12 becomes too large. As a result, the absolute value of the radius of curvature of the object side surface of the second negative lens L12 increases, whereby sagittal coma aberration worsens, and correcting this becomes difficult. If the lower limit value of conditional expression (1) is not reached, the absolute value of the refractive power of the second negative lens L12 becomes too small. And as a result, the absolute value of the radius of curvature of the object side surface of the second negative lens L12 becomes small, which is effective to correct the sagittal coma aberration, however the meridional coma aberration worsens, and correcting this becomes difficult.

To demonstrate the effect of this embodiment with certainty, it is preferable that the upper limit value of conditional expression (1) is 40.00. To demonstrate the effect of this embodiment with greater certainty, it is preferable that the upper limit value of the conditional expression (1) is 30.00. To demonstrate the effect of this embodiment with even greater certainty, it is preferable that the upper limit value of conditional expression (1) is 20.00. To demonstrate the effect of this embodiment with even greater certainty, it is preferable that the upper limit value of the conditional expression (1) is 15.00. To demonstrate the effect of this embodiment with certainty, it is preferable that the lower limit value of conditional expression (1) is 0.85.

In the optical system according to Embodiment 1, it is preferable that the first lens group G1 includes, in order from the object, a first negative lens L11, a second negative lens L12 and a positive lens L13. By this configuration, distortion and lateral chromatic aberration can be corrected satisfactorily.

In the optical system according to Embodiment 1, it is preferable that the following conditional expression (2) is satisfied.

$$-30.00 < vp13 - vn12 < 30.00 \quad (2)$$

where vp13 denotes an Abbe number of the positive lens L13 with respect to the d-line, and vn12 denotes an Abbe number of the second negative lens L12 with respect to the d-line.

The conditional expression (2) specifies the difference between the Abbe number of the second negative lens L12 and the Abbe number of the positive lens L13 constituting the first lens group G1. By satisfying the conditional expression (2), both the longitudinal chromatic aberration and the lateral chromatic aberration can be corrected satisfactorily. If the upper limit value of the conditional expression (2) is exceeded, the Abbe number of the second negative lens L12 becomes too small with respect to the Abbe number of the positive lens L13, therefore correction of the longitudinal chromatic aberration becomes difficult. If the lower limit value of the conditional expression (2) is not reached, the Abbe number of the second negative lens L12 becomes too large with respect to the Abbe number of the positive lens L13, therefore correction of the lateral chromatic aberration becomes difficult.

To demonstrate the effect of the embodiment with certainty, it is preferable that the upper limit value of the conditional expression (2) is 27.00. To demonstrate the effect of this embodiment with greater certainty, it is preferable that the upper limit value of the conditional expression (2) is 25.00. To demonstrate the effect of this embodiment with certainty, it is preferable that the lower limit value of the conditional expression (2) is −27.00. To demonstrate the effect of this embodiment with greater certainty, it is preferable that the lower limit value of the conditional expression (2) is −24.00.

In the optical system according to Embodiment 1, it is preferable that the second negative lens L12 is a meniscus lens having a concave surface facing the object. By this configuration, sagittal coma aberration can be corrected satisfactorily.

In the optical system according to Embodiment 1, it is preferable that the first negative lens L11, the second negative lens L12 and the positive lens L13 constituting the first lens group G1 are all single lenses. By this configuration, distortion and curvature of field can be corrected satisfactorily.

In the optical system according to Embodiment 1, it is preferable that the second lens group G2 has positive refractive power. By using a so called "retro focus type", where the second lens group G2 having positive refractive power is disposed closer to the image than the first lens group G1 having negative refractive power, compactness with a wide angle of view can be implemented while controlling aberrations (especially curvature of field).

In the optical system according to Embodiment 1, it is preferable that an aperture stop S is disposed closer to the object than the second lens group G2. By this configuration, distortion and curvature of field can be corrected satisfactorily, while decreasing the effective diameter of the lens closest to the object, that is, the first negative lens L11 (of the first lens group G1). Furthermore, it is possible to decrease the thickness of the lens barrel in a state where the lens barrel collapses into the camera when the camera is not used, and a slimmer camera can be implemented.

In the optical system according to Embodiment 1, it is preferable that at least one surface of the first negative lens L11 is aspherical. If an aspherical surface is used for the first negative lens L11, where abaxial light passes through a position distant from the optical axis, then curvature of field and astigmatism can be corrected satisfactorily, and aberrations of the entire optical system can be corrected satisfactorily. Normally if achieving a wider angle of view is attempted in an optical system of which the first lens group G1 closest to the object has negative refractive power, negative refractive power of the first lens group G1 must be increased, which makes the correction of aberrations difficult. However if at least one surface of the first negative lens L11 constituting the first lens group G1 is aspherical, as in the case of the optical system of this embodiment, this problem can be solved. Aberrations can be corrected by increasing a number of lenses constituting the first lens group G1, but if a number of lenses of the first lens group G1 increases, the thickness of the lens barrel increases when the camera is not used, that is, when the lens barrel is collapsed, which makes downsizing impossible.

According to the above mentioned optical system of Embodiment 1, an optical system where the lens barrel can collapse into the camera when the camera is not used, but where the camera is still compact, and has a wide angle of view (angle of view: about) 75° and a large aperture (Fno: about 2.0), can be implemented.

Figure 11:
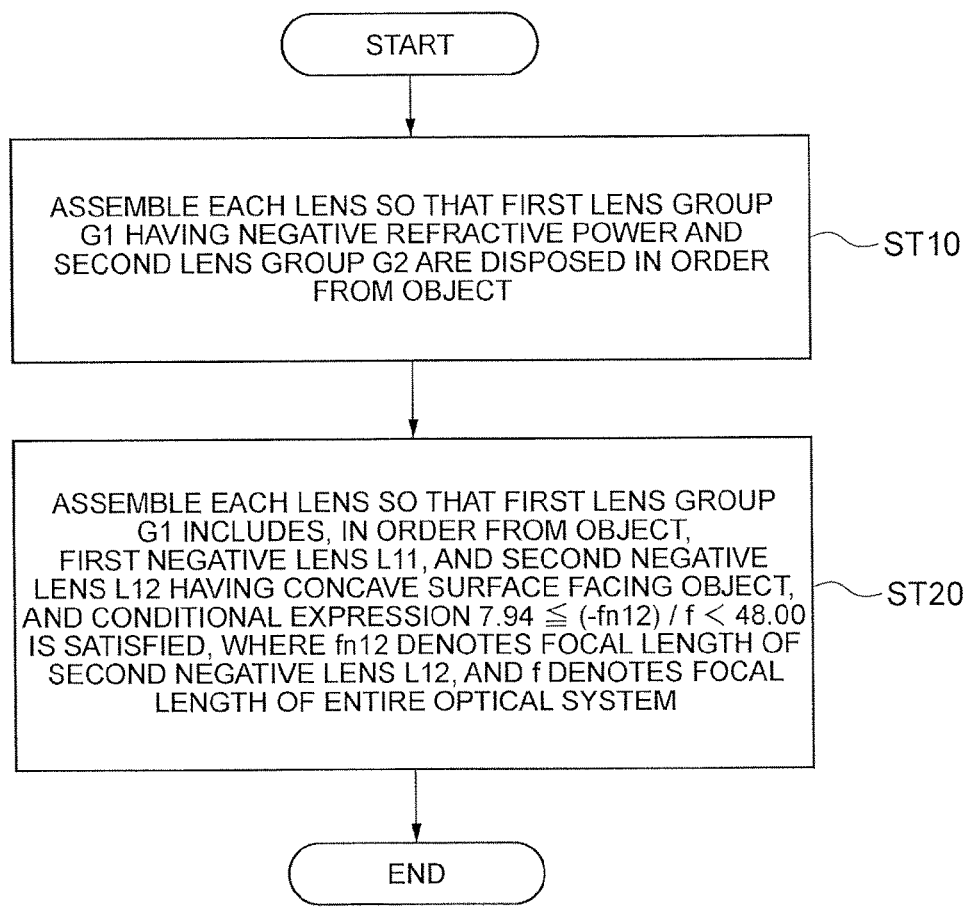
FIG. 11 is a flow chart depicting a method for manufacturing the optical system according to Embodiment 1.

Now a method for manufacturing the optical system will be described with reference to FIG. 11. First the first lens group G1 and the second lens group G2 are assembled in the lens barrel in order from the object (step ST10). In this assembly step, each lens is arranged so that the first lens group G1 has negative refractive power. Then each lens is assembled in the lens barrel so that the first lens group G1 includes, in order from the object, the first negative lens L11 and the second negative lens L12 having a concave surface facing the object, and the following conditional expression (1) is satisfied, where fn12 denotes a focal length of the second negative lens L12, and f denotes a focal length of the entire optical system (step ST20).

$$7.94 \leq (-fn12)/f < 48.00 \tag{1}$$

An example of the lens configuration according to Embodiment 1 is, as illustrated in FIG. 1, the first lens group G1 that includes, in order from the object, a negative meniscus lens L11 having a convex surface facing the object (corresponding to the first negative lens), a negative meniscus lens L12 having a concave surface facing the object (corresponding to the second negative lens), and a biconvex positive lens L13, so that the entire lens group has negative refractive power. The second lens group G2 includes, in order from the object, a biconvex positive lens L21, a cemented lens of a biconvex positive lens L22 and a biconcave negative lens L23, and a cemented lens of a biconcave negative lens L24 and a biconvex positive lens L25, so that the entire lens group has positive refractive power. The third lens group G3 includes a biconvex positive lens L31, so that the entire lens group has positive refractive power.

According to the above mentioned method for manufacturing the optical system according to Embodiment 1, an optical system where the lens barrel can collapse into the camera when the camera is not used, but where the camera is still compact, and has a wide angle of view (angle of view: about 75°) and a large aperture (Fno: about 2.0), can be implemented.

Each example of Embodiment 1 will now be described with reference to the drawings. Table 1 to Table 5 shown below list the data of Example 1 to Example 5.

In each example, the aberration characteristics are calculated with respect to the C-line (wavelength: 656.2730 nm), the d-line (wavelength: 587.5620 nm), the F-line (wavelength: 486.1330 nm), and the g-line (wavelength: 435.8350 nm).

In [Lens Data] in each table, the surface number is the sequential number of the optical surface counted from the object side in the light traveling direction, R denotes the radius of curvature of each optical surface, D denotes a distance from each optical surface to the next optical surface (or image plane) on the optical axis, nd denotes a refractive index of the material of the optical member with respect to the d-line, and vd denotes an Abbe number of the material of the optical member with respect to the d-line. The object surface indicates the surface of the object, (variable) indicates a variable surface distance, "∞" in the radius of curvature indicates a plane or an aperture, (stop FS) indicates a flare-cut stop FS, (stop S) indicates an aperture stop S, and image plane indicates an image plane I. The refractive index of air "1.000000" is omitted. If the optical surface is aspherical, * is affixed to the surface number, and the paraxial radius of curvature is shown in the column of the radius of curvature R.

In [Aspherical Data] in each table, a form of the aspherical surface shown in [Lens Data] is indicated by the following expression (a). X(y) denotes a distance in the optical axis direction from a tangential plane at a vertex of the aspherical surface to a position on the aspherical surface at height y, r denotes a radius of curvature (paraxial radius of curvature) of the reference spherical surface, K denotes a conical coefficient, and Ai denotes an aspherical coefficient of the i-th order. "E-n" indicates "×10$^{-n}$". For example, 1.234E-05=1.234×10$^{-5}$.

$$X(y)=(y^2/r)/\{1+(1-\kappa \times y^2/r^2)^{1/2}\}+A4 \times y^4+A6 \times y^6+A8 \times y^8+A10 \times y^{10} \tag{a}$$

In [Various Data], β denotes a photographic magnification at each focal position, f denotes a focal length of the entire optical system, FNO denotes an F number, ω denotes a half angle of view (maximum incident angle, unit: °), Y denotes an image height, TL denotes a total length of the optical system, Bf denotes a distance from an image side surface of an optical member disposed closest to the image to a paraxial image plane, and Bf (air conversion) denotes a distance from the last optical surface to the paraxial image plane converted into air.

In [Variable Surface Distance Data], β denotes a photographic magnification at each focal position, and Di denotes a variable surface distance of the i-th surface.

In [Conditional Expression], a value corresponding to each conditional expression (1) and (2) is shown.

In all the data values herein below, "mm" is normally used as the unit of focal length f, radius of curvature R, surface distance D and other lengths if not otherwise specified, but the unit is not limited to "mm", and another appropriate unit may be used, since an equivalent optical performance is obtained even if the optical system is proportionally expanded or proportionally reduced.

This description on the table is the same for all examples, and is therefore omitted herein below.

EXAMPLE 1

Example 1 will be described with reference to FIG. 1, FIG. 2 and Table 1. As illustrated in FIG. 1, the optical system WL1 according to Example 1 has, in order from an object, a first lens group G1 having negative refractive power, a flare-cut stop FS, an aperture stop S, a second lens group G2 having positive refractive power, a third lens group G3 having positive refractive power, and a filter group FL.

The first lens group G1 includes, in order from the objet, a negative meniscus lens L11 having a convex surface facing the object, a negative meniscus lens L12 having a concave surface facing the object, and a biconvex positive lens L13. The image side lens surface of the negative lens L11 is aspherical.

The second lens group G2 includes, in order from the object, a biconvex positive lens L21, a cemented lens of a biconvex positive lens L22 and a biconcave negative lens L23 and a cemented lens of a biconcave negative lens L24 and a biconvex positive lens L25. The image side lens surface of the positive lens L25 is aspherical.

The third lens group G3 is constituted by a biconvex positive lens L31.

The filter group FL is constituted by a low-pass filter, an infrared cut-off filter or the like, in order to cut off the spatial frequency exceeding the critical resolution of a solid-state picture element (e.g. CCD, CMOS) disposed on the image plane I.

In the optical system WL1 of Example 1 having this configuration, it is preferable that focusing from an object at infinity to an object at a finite distance with about magnification β=−0.036 is performed by moving the third lens group G3 along the optical axis. It is preferable that focusing on an object at a closer distance with magnification β greater than −0.036 is performed by moving the second lens group G2 and the third lens group G3 respectively along the optical axis.

Table 1 shows each data value of Example 1. The surface numbers 1 to 22 in Table 1 correspond to each optical surface with the radius of curvatures R1 to R22 shown in FIG. 1 respectively. In Example 1, surface 2 and surface 16 are aspherical.

TABLE 1

[Lens Data]

| Surface number | R | D | nd | vd |
|---|---|---|---|---|
| Object surface | ∞ | | | |
| 1 | 3.1165 | 0.0865 | 1.58887 | 61.18 |
| *2 | 0.6081 | 0.4599 | | |
| 3 | −1.8383 | 0.0703 | 1.64769 | 33.72 |
| 4 | −2.9040 | 0.0054 | | |
| 5 | 2.9983 | 0.1292 | 1.91082 | 35.25 |
| 6 | −7.4630 | 0.2432 | | |
| 7 (stop FS) | ∞ | D7 (variable) | | |
| 8 (stop S) | ∞ | 0.0054 | | |
| 9 | 0.9061 | 0.2836 | 1.49782 | 82.57 |
| 10 | −2.4942 | 0.0300 | | |
| 11 | 1.3051 | 0.1396 | 1.81600 | 46.59 |
| 12 | −4.0050 | 0.0541 | 1.63980 | 34.55 |
| 13 | 0.9171 | 0.1896 | | |
| 14 | −1.0976 | 0.1415 | 1.74077 | 27.74 |
| 15 | 3.1688 | 0.1183 | 1.85135 | 40.10 |
| *16 | −1.8460 | D16 (variable) | | |
| 17 | 4.0638 | 0.1269 | 1.61800 | 63.34 |
| 18 | −7.0747 | D18 (variable) | | |
| 19 | ∞ | 0.0859 | 1.51680 | 64.20 |
| 20 | ∞ | 0.0541 | | |
| 21 | ∞ | 0.0378 | 1.51680 | 64.20 |
| 22 | ∞ | BF | | |
| Image plane | ∞ | | | |

[Aspherical Data]

Surface 2

κ = 0.7405, A4 = −4.0210E−02, A6 = −3.5389E−01, A8 = 8.1231E−01, A10 = −2.8594E+00

Surface 16

κ = 1.0000, A4 = 3.9172E−01, A6 = 7.6310E−01, A8 = −6.1183E−02, A10 = 4.3105E+00

[Various Data]

| | | | |
|---|---|---|---|
| β | 0.0000 | −0.0359 | −0.1790 |
| f | 1.0000 | 0.9827 | 1.0114 |
| FNO | 2.0578 | 0.0087 | 0.0405 |
| ω | 38.6243 | 22.2887 | 4.4517 |
| Y | 0.7830 | 0.7830 | 0.7830 |
| TL | 3.7961 | 3.7961 | 3.7961 |
| BF | 0.0378 | 0.0378 | 0.0378 |
| BF (air conversion) | 0.8130 | 0.9059 | 1.0916 |

[Variable Surface Distance Data]

| | | | |
|---|---|---|---|
| β | 0.0000 | −0.0359 | −0.1790 |
| D7 | 0.5620 | 0.5620 | 0.4164 |
| D16 | 0.2953 | 0.2024 | 0.1622 |
| D18 | 0.6395 | 0.7324 | 0.9182 |
| BF | 0.0378 | 0.0378 | 0.0378 |

[Conditional Expressions]

fn12 = −7.9400
f = 1.0000
vn12 = 33.72
vp13 = 35.25
Conditional expression (1) (−fn12)/f = 7.940
Conditional expression (2) vp13 − vn12 = −1.53

As Table 1 shows, the optical system WL1 of Example 1 satisfies the conditional expressions (1) and (2).

Figure 2B:
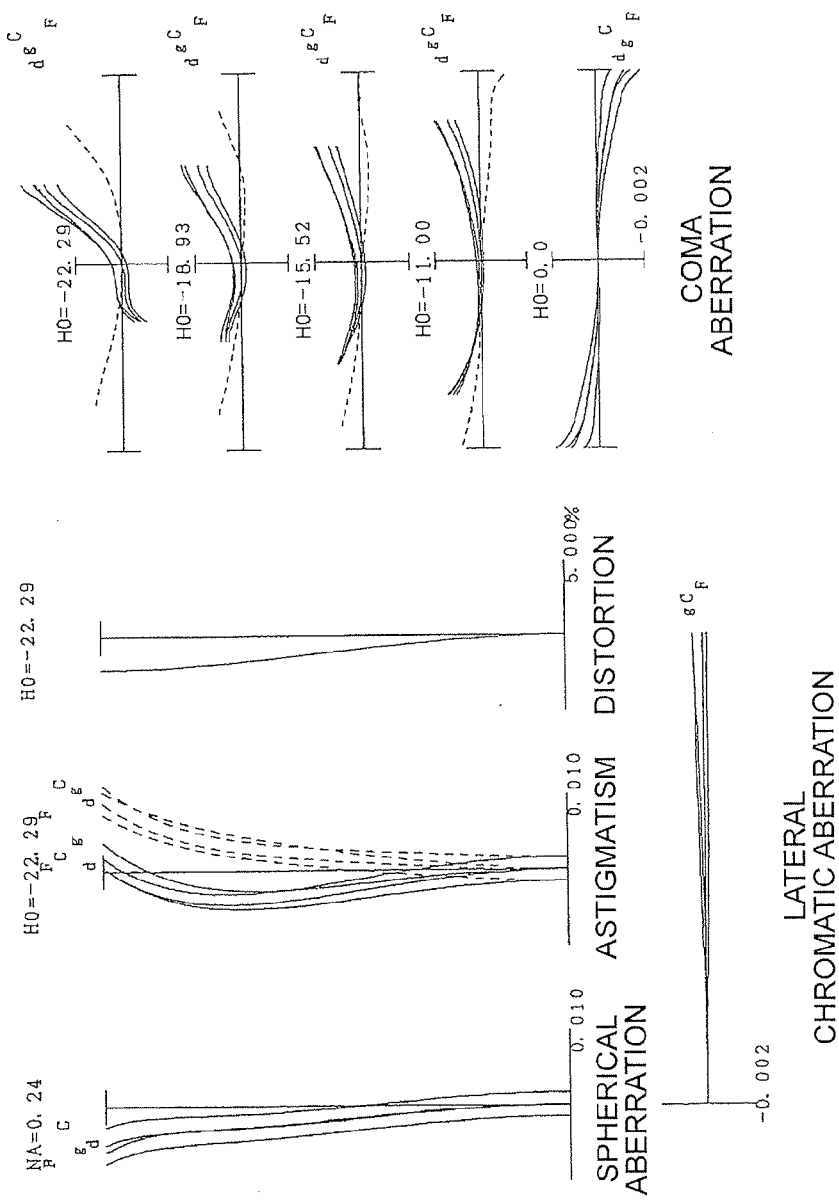
FIG. 2B shows an aberration upon focusing on a point at an intermediate distance ($\beta=-0.0359$)
Figure 2C:
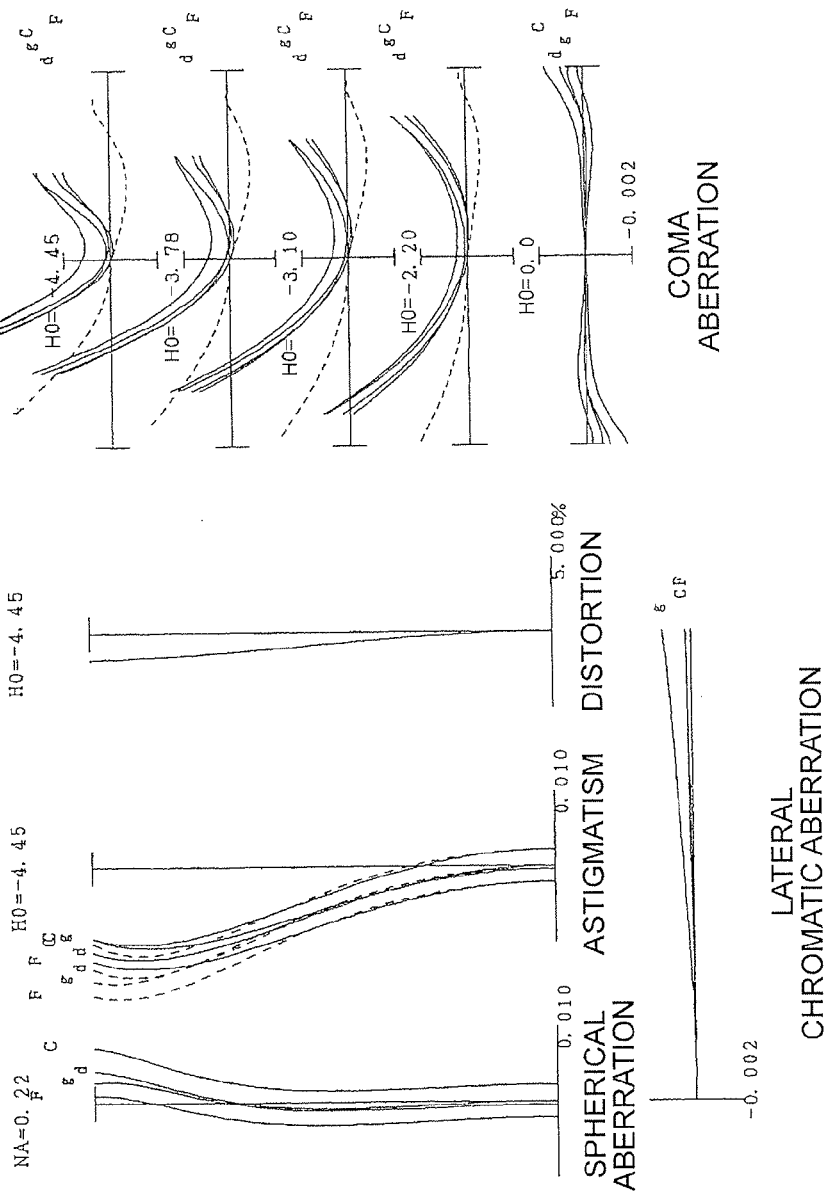
FIG. 2C shows an aberration upon focusing on a nearest point ($\beta=-0.1790$)

FIG. 2 are graphs showing various aberrations (spherical aberration, astigmatism, distortion, coma aberration and lateral chromatic aberration) of the optical system WL1 according to Example 1, where FIG. 2A are graphs showing various aberrations upon focusing on infinity (β=0.0000), FIG. 2B are graphs showing various aberrations upon focusing on a point at an intermediate distance (β=−0.0359), and FIG. 2C are graphs showing various aberrations upon focusing on an a nearest point (β=−0.1790).

In each graph showing aberrations, FNO denotes an F number, NA denotes numeral aperture, A denotes a half angle of view (unit: °) with respect to each image height, and HO denotes object height. d indicates aberration at the d-line, g indicates aberration at the g-line, C indicates aberration at the C-line, and F indicates aberration at the F-line. In graphs showing astigmatism, the solid line indicates the sagittal image surface, and the broken line indicates the meridional image surface. In graphs showing coma aberration, the solid line indicates the meridional coma aberration, the dotted line indicates the sagittal coma aberration, and the dotted line to the right of the origin shows the sagittal coma Aberration that is generated in the meridional direction with respect to the d-line, and the dotted line to the left of the origin indicates the sagittal coma aberration that is generated in the sagittal direction with respect to the d-line. The reference symbols of this example are the same for graphs showing various aberrations in each example described later.

As each graph showing aberrations in FIG. 2A to FIG. 2C clarifies, various aberrations are corrected satisfactorily, demonstrating that the optical system WL1 according to Example 1, has excellent image forming performance.

EXAMPLE 2

Figure 3A:
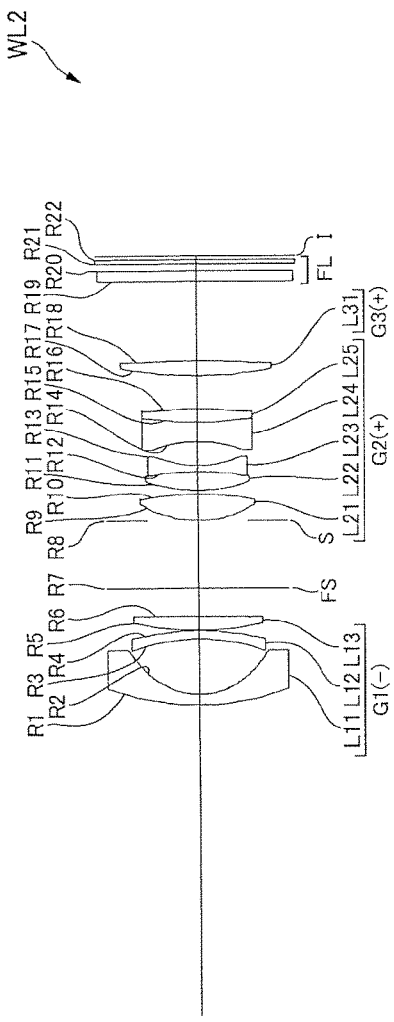
FIG. 3A shows an arrangement upon focusing on infinity ($\beta=0.0000$)
Figure 3B:
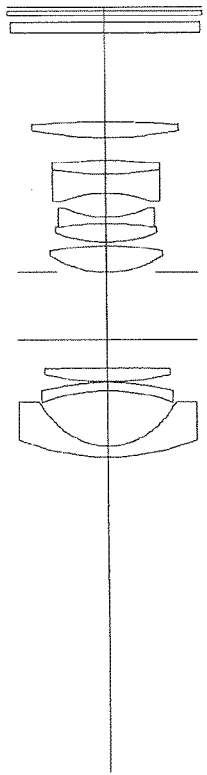
FIG. 3B shows an arrangement upon focusing on a point at an intermediate distance ($\beta=-0.0359$)
Figure 3C:
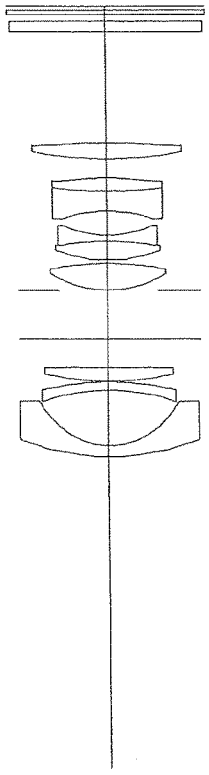
FIG. 3C shows an arrangement upon focusing on a nearest point ($\beta=-0.1808$)

Example 2 will be described with reference to FIG. 3, FIG. 4 and Table 2. As illustrated in FIG. 3, the optical system WL2 according to Example 2 has, in order from an object, a first lens group G1 having negative refractive power, a flare-cut stop FS, an aperture stop S, a second lens group G2 having positive refractive power, a third lens group G3 having positive refractive power, and a filter group FL.

The first lens group G1 includes, in order from the objet, a negative meniscus lens L11 having a convex surface facing the object, a negative meniscus lens L12 having a concave surface facing the object, and a biconvex positive lens L13. The image side lens surface of the negative lens L11 is aspherical.

The second lens group G2 includes, in order from the Object, a biconvex positive lens L21, a cemented lens of a biconvex positive lens L22 and a biconcave negative lens L23 and a cemented lens of a biconcave negative lens L24 and a biconvex positive lens L25. The image side lens surface of the positive lens L25 is aspherical.

The third lens group G3 is constituted by a biconvex positive lens L31.

The filter group FL is constituted by a low-pass filter, an infrared cut-off filter or the like, in order to cut off the spatial frequency exceeding the critical resolution of a solid-state picture element (e.g. CCD, CMOS) disposed on the image plane I.

In the optical system WL2 of Example 2 having this configuration, it is preferable that focusing from an object at infinity to an object at a finite distance with about magnification β=−0.036 is performed by moving the third lens group G3 along the optical axis. It is preferable that focusing on an object at a closer distance with magnification β greater than −0.036 is performed by moving the second lens group G2 and the third lens group G3 respectively along the optical axis.

Table 2 shows each data value of Example 2. The surface numbers 1 to 22 in Table 2 correspond to each optical surface with the radius of curvatures R1 to R22 shown in FIG. 3 respectively. In Example 2, surface 2 and surface 16 are aspherical.

TABLE 2

[Lens Data]

| Surface number | R | D | nd | vd |
|---|---|---|---|---|
| Object surface | ∞ | | | |
| 1 | 2.1683 | 0.0865 | 1.65160 | 58.57 |
| *2 | 0.6037 | 0.4696 | | |
| 3 | −1.7338 | 0.0703 | 1.65160 | 58.57 |
| 4 | −2.5052 | 0.0054 | | |
| 5 | 2.5066 | 0.1196 | 1.91082 | 35.25 |
| 6 | −51.3167 | 0.2432 | | |
| 7 (stop FS) | ∞ | D7 (variable) | | |
| 8 (stop S) | ∞ | 0.0054 | | |
| 9 | 0.9353 | 0.2267 | 1.49782 | 82.57 |
| 10 | −2.6799 | 0.0300 | | |
| 11 | 1.3064 | 0.1581 | 1.81600 | 46.59 |
| 12 | −2.7803 | 0.0541 | 1.63980 | 34.55 |
| 13 | 0.9475 | 0.2049 | | |
| 14 | −1.1175 | 0.1622 | 1.74077 | 27.74 |
| 15 | 3.0862 | 0.1173 | 1.85135 | 40.10 |
| *16 | −1.9644 | D16 (variable) | | |
| 17 | 3.4543 | 0.1301 | 1.61800 | 63.34 |
| 18 | −8.5882 | D18 (variable) | | |
| 19 | ∞ | 0.0859 | 1.51680 | 64.20 |
| 20 | ∞ | 0.0541 | | |
| 21 | ∞ | 0.0378 | 1.51680 | 64.20 |
| 22 | ∞ | BF | | |
| Image plane | ∞ | | | |

[Aspherical Data]

Surface 2

κ = 0.7459, A4 = −3.1095E−02, A6 = −3.1108E−01, A8 = 7.8697E−01, A10 = −2.7179E+00

Surface 16

κ = 1.0000, A4 = 3.8533E−01, A6 = 6.7573E−01, A8 = 1.5412E−01, A10 = 2.8386E+00

[Various Data]

| β | 0.0000 | −0.0359 | −0.1808 |
|---|---|---|---|
| f | 1.0000 | 0.9837 | 1.0222 |
| FNO | 2.0506 | 0.0088 | 0.0403 |
| ω | 38.6241 | 22.2827 | 4.4077 |
| Y | 0.783 | 0.783 | 0.783 |
| TL | 3.8270 | 3.8270 | 3.8270 |
| BF | 0.0378 | 0.0378 | 0.0378 |
| BF (air conversion) | 0.8512 | 0.9369 | 1.1260 |

[Variable Surface Distance Data]

| β | 0.0000 | −0.0359 | −0.1808 |
|---|---|---|---|
| D7 | 0.5707 | 0.5707 | 0.4133 |
| D16 | 0.2796 | 0.1939 | 0.1622 |
| D18 | 0.6777 | 0.7634 | 0.9525 |
| BF | 0.0378 | 0.0378 | 0.0378 |

[Conditional Expressions]

fn12 = −8.9629
f = 1.0000
vn12 = 58.57
vp13 = 35.25
Conditional expression (1) (−fn12)/f = 8.962
Conditional expression (2) vp13 − vn12 = −23.32

As Table 2 shows, the optical system WL2 of Example 2 satisfies the conditional expressions (1) and (2).

Figure 4A:
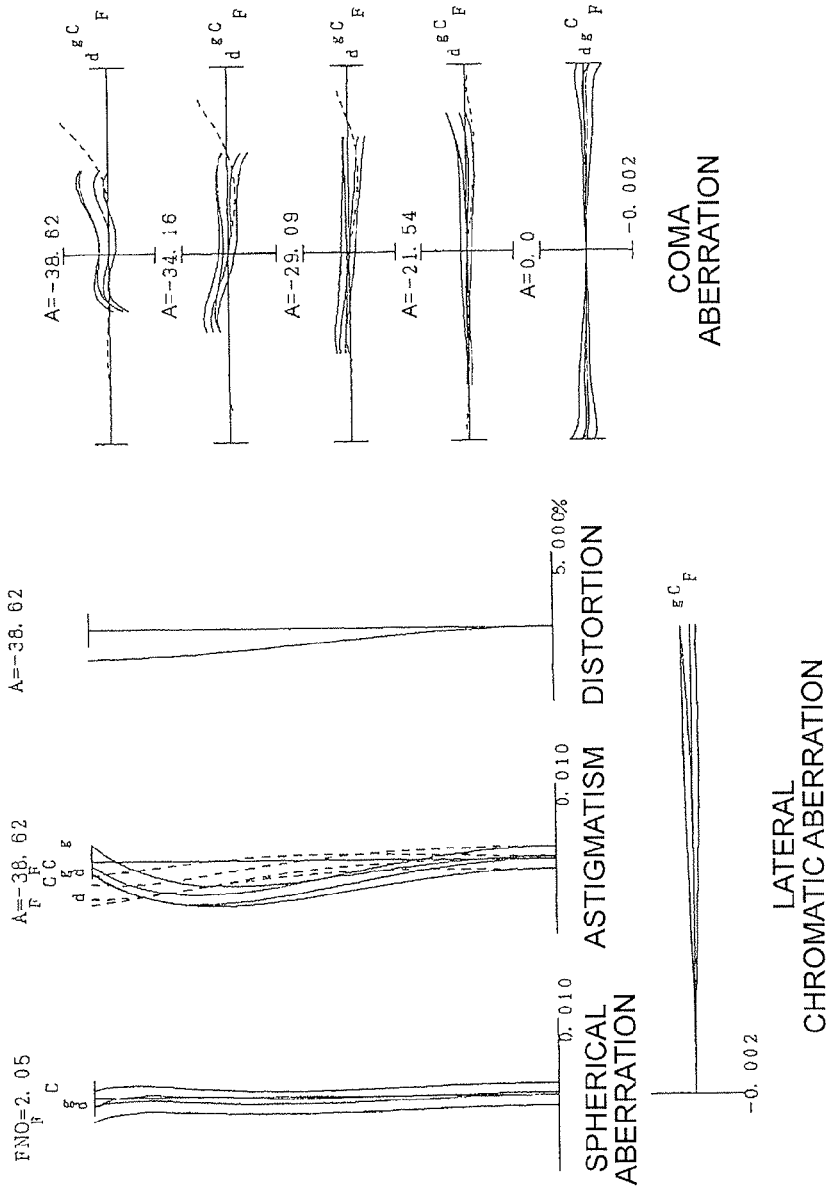
FIG. 4A shows an aberration upon focusing on infinity ($\beta=0.0000$)

FIG. 4 are graphs showing various aberrations (spherical aberration, astigmatism, distortion, coma aberration and lateral chromatic aberration) of the optical system WL2 according to Example 2, where FIG. 4A are graphs showing various aberrations upon focusing on infinity ($\beta$=0.0000), FIG. 4B are graphs showing various aberrations upon focusing on a point at an intermediate distance ($\beta$=−0.0359), and FIG. 4C are graphs showing various aberrations upon focusing on a nearest point ($\beta$=−0.1808). As each graph showing aberrations in FIG. 4A to FIG. 4C clarifies, various aberrations are corrected satisfactorily, demonstrating that the optical system WL2 according to Example 2 has excellent image forming performance.

EXAMPLE 3

Figure 5A:
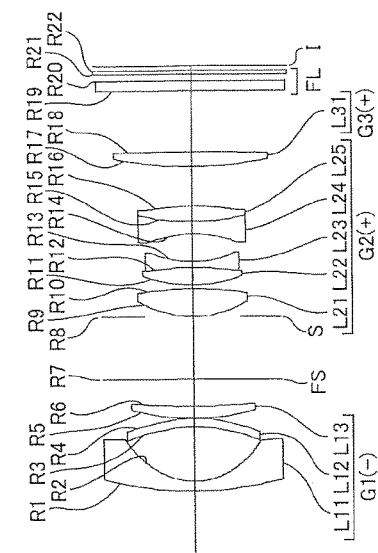
FIG. 5A shows an arrangement upon focusing on infinity ($\beta=0.0000$)
Figure 5B:
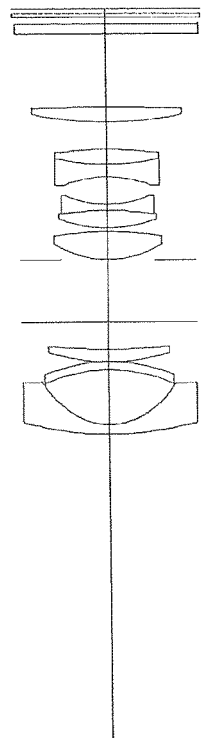
FIG. 5B shows an arrangement upon focusing on a point at an intermediate distance ($\beta=-0.0358$)
Figure 5C:
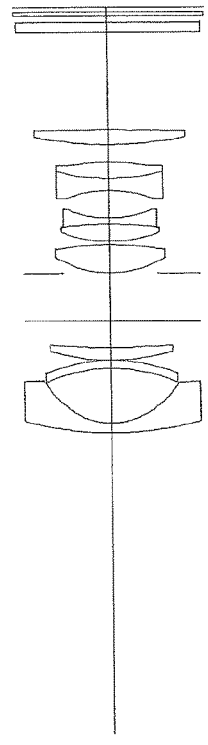
FIG. 5C shows an arrangement upon focusing on a nearest point ($\beta=-0.1772$)

Example 3 will be described with reference to FIG. 5, FIG. 6 and Table 3. As illustrated in FIG. 5, the optical system WL3 according to Example 3 has, in order from an object, a first lens group G1 having negative refractive power, a flare-cut stop FS, an aperture stop S, a second lens group G2 having positive refractive power, a third lens group G3 having positive refractive power, and a filter group FL.

The first lens group G1 includes, in order from the objet, a negative meniscus lens L11 having a convex surface facing the object, a negative meniscus lens L12 having a concave surface facing the object, and a positive meniscus lens L13 having a convex surface facing the object. The object side and image side lens surfaces of the negative lens L11 are aspherical.

The second lens group G2 includes, in order from the Object, a biconvex positive lens L21, a cemented lens of a biconvex positive lens L22 and a biconcave negative lens L23 and a cemented lens of a biconcave negative lens L24 and a biconvex positive lens L25. The image side lens surface of the positive lens L25 is aspherical.

The third lens group G3 is constituted by a biconvex positive lens L31.

The filter group FL is constituted by a low-pass filter, an infrared cut-off filter or the like, in order to cut off the spatial frequency exceeding the critical resolution of a solid-state picture element (e.g. CCD, CMOS) disposed on the image plane I.

In the optical system WL3 of Example 3 having this configuration, it is preferable that focusing from an object at infinity to an object at a finite distance with about magnification $\beta$=−0.036 is performed by moving the third lens group G3 along the optical axis. It is preferable that focusing on an object at a closer distance with magnification $\beta$ greater than −0.036 is performed by moving the second lens group G2 and the third lens group G3 respectively along the optical axis.

Table 3 shows each data value of Example 3. The surface numbers 1 to 22 in Table 3 correspond to each optical surface with the radius of curvatures R1 to R22 shown in FIG. 5 respectively. In Example 3, surface 1, surface 2 and surface 16 are aspherical.

TABLE 3

[Lens Data]

| Surface number | R | D | nd | vd |
|---|---|---|---|---|

TABLE 3-continued

| | | | | |
|---|---|---|---|---|
| Object surface | ∞ | | | |
| *1 | 2.7161 | 0.0865 | 1.56907 | 71.31 |
| *2 | 0.5942 | 0.4838 | | |
| 3 | −1.5120 | 0.0703 | 1.94594 | 17.98 |
| 4 | −1.6048 | 0.0054 | | |
| 5 | 1.9973 | 0.1054 | 1.83481 | 42.73 |
| 6 | 6.0051 | 0.2432 | | |
| 7 (stop FS) | ∞ | D7 (variable) | | |
| 8 (stop S) | ∞ | 0.0054 | | |
| 9 | 0.9397 | 0.2465 | 1.49782 | 82.57 |
| 10 | −3.0467 | 0.0300 | | |
| 11 | 1.2643 | 0.1513 | 1.81600 | 46.59 |
| 12 | −3.2577 | 0.0541 | 1.62588 | 35.72 |
| 13 | 0.9532 | 0.2435 | | |
| 14 | −1.1296 | 0.1084 | 1.74077 | 27.74 |
| 15 | 1.9667 | 0.1393 | 1.85135 | 40.10 |
| *16 | −1.8542 | D16 (variable) | | |
| 17 | 3.3148 | 0.1307 | 1.61800 | 63.34 |
| 18 | −23.3972 | D18 (variable) | | |
| 19 | ∞ | 0.0859 | 1.51680 | 64.20 |
| 20 | ∞ | 0.0541 | | |
| 21 | ∞ | 0.0378 | 1.51680 | 64.20 |
| 22 | ∞ | BF | | |
| Image plane | ∞ | | | |

[Aspherical Data]

Surface 1

$\kappa$ = 1.0000, A4 = −4.6830E−02, A6 = 2.6892E−02, A8 = 0.0000E+00, A10 = 0.0000E+00

Surface 2

$\kappa$ = 0.7000, A4 = −6.8433E−02, A6 = −3.9644E−01, A8 = 6.3204E−01, A10 = −2.2238E+00

Surface 16

$\kappa$ = 1.0000, A4 = 4.0859E−01, A6 = 8.1892E−01, A8 = −3.5120E−01, A10 = 3.6169E+00

[Various Data]

| | | | |
|---|---|---|---|
| $\beta$ | 0.0000 | −0.0358 | −0.1772 |
| f | 1.0000 | 0.9808 | 1.0035 |
| FNO | 2.0547 | 0.0087 | 0.0400 |
| $\omega$ | 38.6241 | 22.3739 | 4.4933 |
| Y | 0.783 | 0.783 | 0.783 |
| TL | 3.7558 | 3.7558 | 3.7558 |
| BF | 0.0378 | 0.0378 | 0.0378 |
| BF (air conversion) | 0.7111 | 0.7332 | 1.0339 |

[Variable Surface Distance Data]

| | | | |
|---|---|---|---|
| $\beta$ | 0.0000 | −0.0358 | −0.1772 |
| D7 | 0.5460 | 0.5460 | 0.4139 |
| D16 | 0.3528 | 0.2423 | 0.1622 |
| D18 | 0.5376 | 0.6482 | 0.8604 |
| BF | 0.0378 | 0.0378 | 0.0378 |

[Conditional Expressions]

fn12 = −43.7506
f = 1.0000
vn12 = 17.98
vp13 = 42.73
Conditional expression (1) (−fn12)/f = 43.750
Conditional expression (2) vp13 − vn12 = 24.75

As Table 3 shows, the optical system WL3 of Example 3 satisfies the conditional expressions (1) and (2).

Figure 6A:
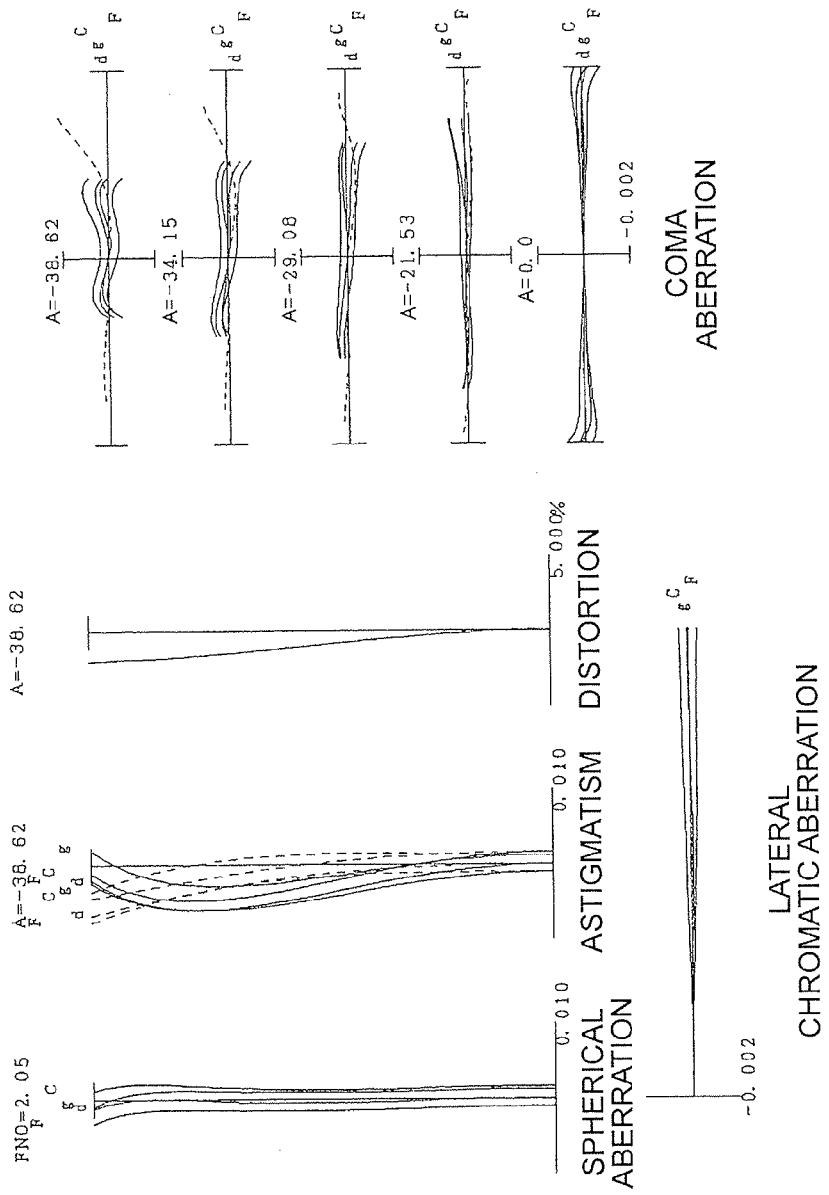
FIG. 6A shows an Aberration upon focusing on infinity ($\beta=0.0000$)
Figure 6C:
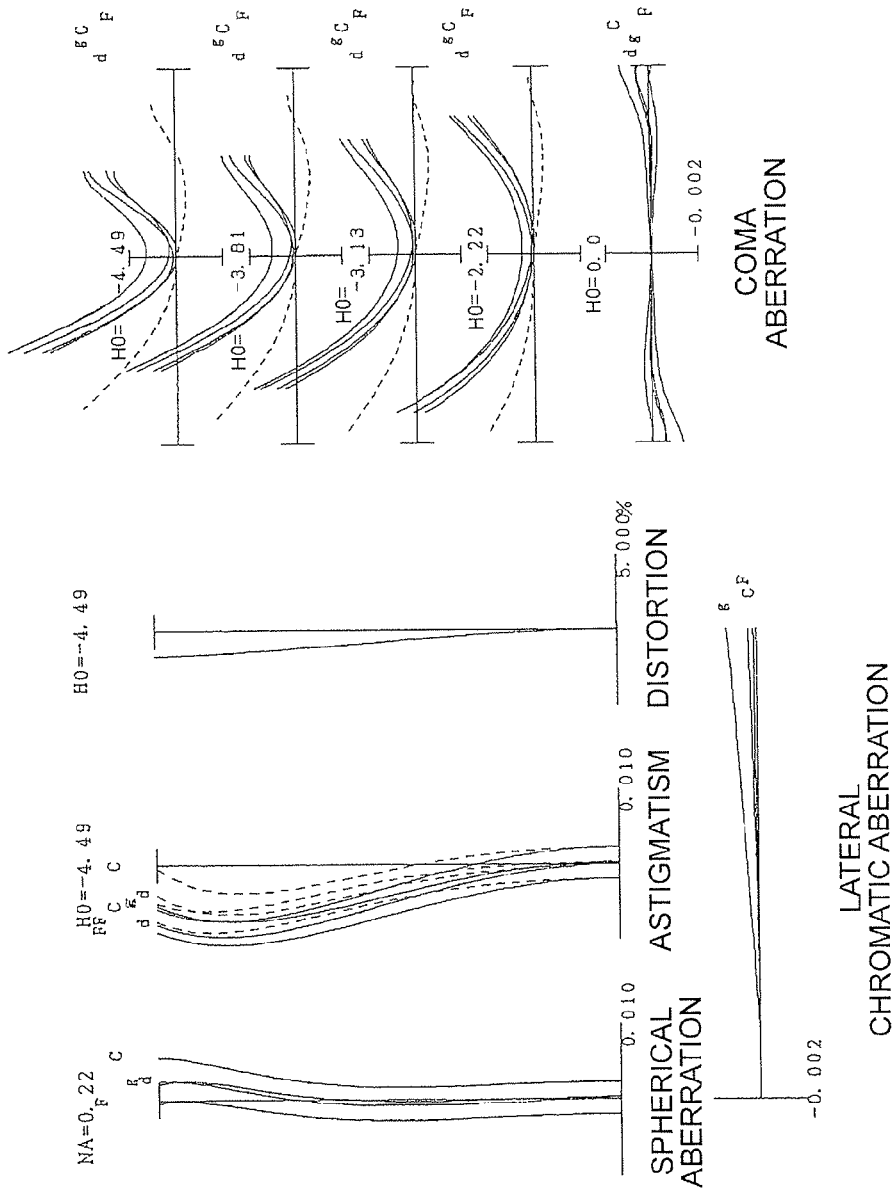
FIG. 6C shows an aberration upon focusing on a nearest point ($\beta=-0.1772$)

FIG. 6 are graphs showing various aberrations (spherical aberration, astigmatism, distortion, coma aberration and lateral chromatic aberration) of the optical system WL3 according to Example 3, where FIG. 6A are graphs showing various aberrations upon focusing on infinity ($\beta$=0.0000), FIG. 6B are graphs showing various aberrations upon focusing on a point at an intermediate distance ($\beta$=−0.0358), and FIG. 6C are graphs showing various aberrations upon focusing on a nearest point ($\beta$=−0.1772). As each graph showing aberrations in FIG. 6A to FIG. 6C clarifies, various aberrations are corrected satisfactorily, demonstrating that the optical system WL3 according to Example 3 has excellent image forming performance.

EXAMPLE 4

Figure 7A:
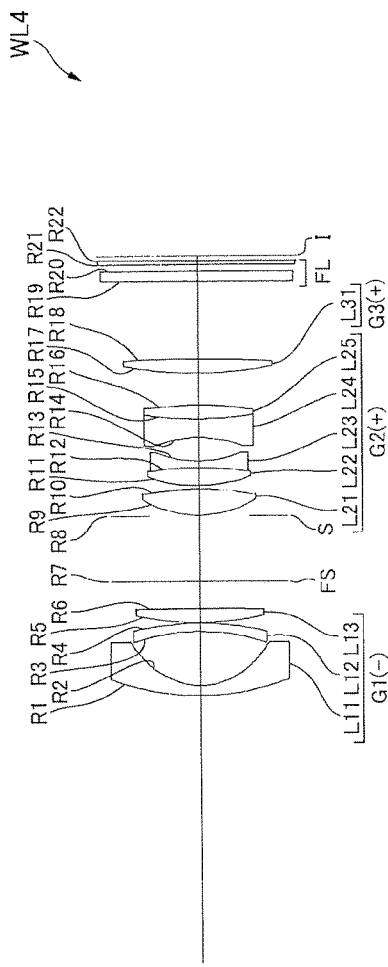
FIG. 7A shows an arrangement upon focusing on infinity ($\beta=0.000$)
Figure 7B:
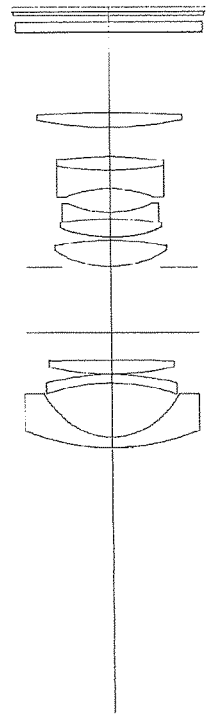
FIG. 7B shows an arrangement upon focusing on a point at an intermediate distance ($\beta=-0.009$)
Figure 7C:
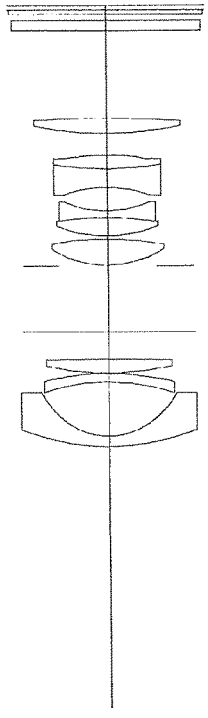
FIG. 7C shows an arrangement upon focusing on a nearest point ($\beta=-0.036$)

Example 4 will be described with reference to FIG. 7, FIG. 8 and Table 4. As illustrated in FIG. 7, the optical system WL4 according to Example 4 has, in order from an object, a first lens group G1 having negative refractive power, a flare-cut stop FS, an aperture stop S, a second lens group G2 having positive refractive power, a third lens group G3 having positive refractive power, and a filter group FL.

The first lens group G1 includes, in order from the objet, a negative meniscus lens L11 having a convex surface facing the object, a negative meniscus lens L12 having a concave surface facing the object, and a biconvex positive lens L13. The image side lens surface of the negative lens L11 is aspherical.

The second lens group G2 includes, in order from the Object, a biconvex positive lens L21, a cemented lens of a biconvex positive lens L22 and a biconcave negative lens L23 and a cemented lens of a biconcave negative lens L24 and a biconvex positive lens L25. The image side lens surface of the positive lens L25 is aspherical.

The third lens group G3 is constituted by a biconvex positive lens L31.

The filter group FL is constituted by a low-pass filter, an infrared cut-off filter or the like, in order to cut off the spatial frequency exceeding the critical resolution of a solid-state picture element (e.g. CCD, CMOS) disposed on the image plane I.

In the optical system WL4 of Example 4 having this configuration, it is preferable that focusing from an object at infinity to an object at a finite distance with about magnification $\beta$=−0.036 is performed by moving the third lens group G3 along the optical axis. It is preferable that focusing on an object at a closer distance with magnification $\beta$ greater than −0.036 is performed by moving the second lens group G2 and the third lens group G3 respectively along the optical axis.

Table 4 shows each data value of Example 4. The surface numbers 1 to 22 in Table 4 correspond to each optical surface with the radius of curvatures R1 to R22 shown in FIG. 7 respectively. In Example 4, surface 2 and surface 16 are aspherical.

TABLE 4

[Lens Data]

| Surface number | R | D | nd | vd |
|---|---|---|---|---|
| Object surface | ∞ | | | |
| 1 | 2.1637 | 0.0865 | 1.6516 | 58.57 |
| *2 | 0.6042 | 0.4694 | | |
| 3 | −1.7507 | 0.0703 | 1.6700 | 57.35 |
| 4 | −2.5109 | 0.0054 | | |
| 5 | 2.4999 | 0.1198 | 1.9108 | 35.25 |

TABLE 4-continued

| 6 | −52.2956 | 0.2432 | | |
|---|---|---|---|---|
| 7 | ∞ | D7 (variable) | | |
| (stop FS) | | | | |
| 8 | ∞ | 0.0054 | | |
| (stop S) | | | | |
| 9 | 0.9370 | 0.2274 | 1.4978 | 82.57 |
| 10 | −2.6585 | 0.0300 | | |
| 11 | 1.2910 | 0.1576 | 1.8160 | 46.59 |
| 12 | −2.8071 | 0.0541 | 1.6398 | 34.55 |
| 13 | 0.9366 | 0.2032 | | |
| 14 | −1.1194 | 0.1622 | 1.7408 | 27.74 |
| 15 | 3.0615 | 0.1191 | 1.8513 | 40.10 |
| *16 | −1.9609 | D16 (variable) | | |
| 17 | 3.3931 | 0.1295 | 1.6180 | 63.34 |
| 18 | −9.4947 | D18 (variable) | | |
| 19 | ∞ | 0.0859 | 1.5168 | 64.20 |
| 20 | ∞ | 0.0541 | | |
| 21 | ∞ | 0.0378 | 1.5168 | 64.20 |
| 22 | ∞ | BF | | |
| Image plane | ∞ | | | |

[Aspherical Data]

Surface 2

$\kappa$ = 0.7466, A4 = −2.9535E−02, A6 = −3.0881E−01, A8 = 7.8703E−01, A10 = −2.6992E+00

Surface 16

$\kappa$ = 1.0000, A4 = 4.0859E−01, A6 = 8.1892E−01, A8 = −3.5120E−01, A10 = 3.6169E+00

[Various Data]

| $\beta$ | 0.000 | −0.009 | −0.036 |
|---|---|---|---|
| f | 1.000 | 0.996 | 0.984 |
| FNO | 2.051 | 0.002 | 0.009 |
| $\omega$ | 38.624 | 87.096 | 22.281 |
| Y | 0.783 | 0.783 | 0.783 |
| TL | 3.820 | 3.820 | 3.820 |
| BF | 0.378 | 0.378 | 0.378 |
| BF (air conversion) | 1.189 | 1.212 | 1.276 |

[Variable Surface Distance Data]

| $\beta$ | 0.000 | −0.009 | −0.036 |
|---|---|---|---|
| D7 | 0.569 | 0.569 | 0.569 |
| D16 | 0.277 | 0.254 | 0.190 |
| D18 | 0.675 | 0.698 | 0.762 |
| BF | 0.378 | 0.378 | 0.378 |

[Conditional Expressions]

fn12 = −8.96292
f = 1.0000
vn12 = 57.35
vp13 = 35.25
Conditional expression (1) (−fn12)/f = 8.963
Conditional expression (2) vp13 − vn12 = −22.10

As Table 4 shows, the optical system WL4 of Example 4 satisfies the conditional expressions (1) and (2).

Figure 8B:
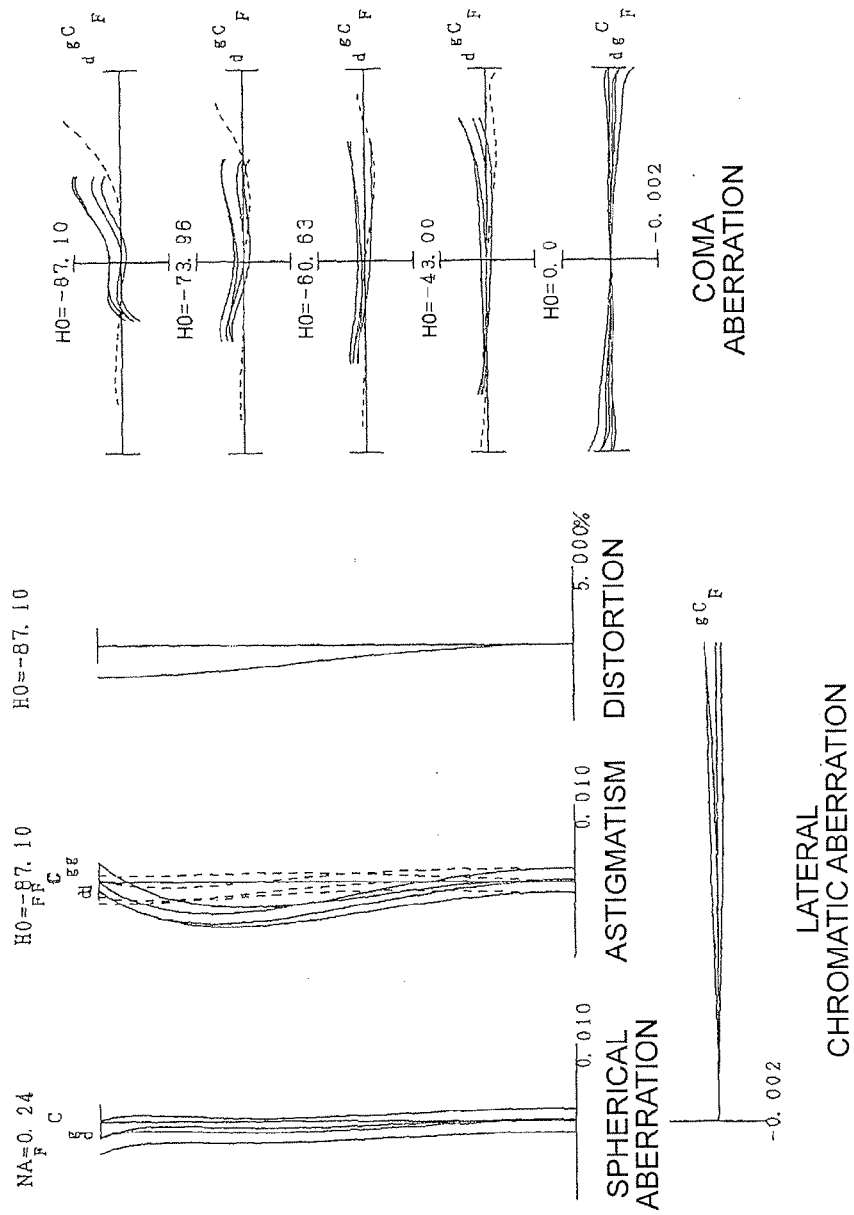
FIG. 8B shows an aberration upon focusing on a point at an intermediate distance ($\beta=-0.009$)

FIG. 8 are graphs showing various aberrations (spherical aberration, astigmatism, distortion, coma aberration and lateral chromatic aberration) of the optical system WL4 according to Example 4, where FIG. 8A are graphs showing various aberrations upon focusing on infinity ($\beta$=0.000), FIG. 8B are graphs showing various aberrations upon focusing on a point at an intermediate distance ($\beta$=−0.009), and FIG. 8C are graphs showing various aberrations upon focusing on a nearest point ($\beta$=−0.036). As each graph showing aberrations in FIG. 8A and FIG. 8B clarifies, various aberrations are corrected satisfactorily, demonstrating that the optical system WL4 according to Example 4 has excellent image forming performance.

EXAMPLE 5

Figure 9A:
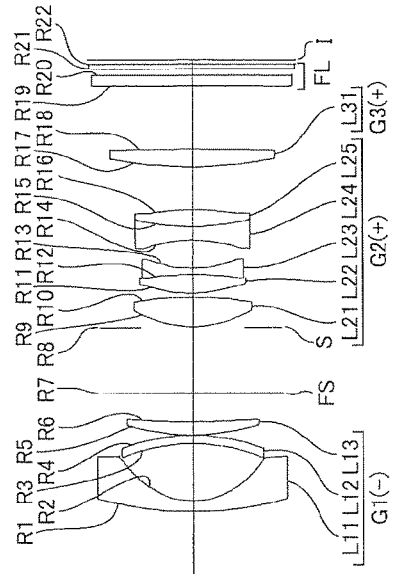
FIG. 9A shows an arrangement upon focusing on infinity ($\beta=0.000$)
Figure 9B:
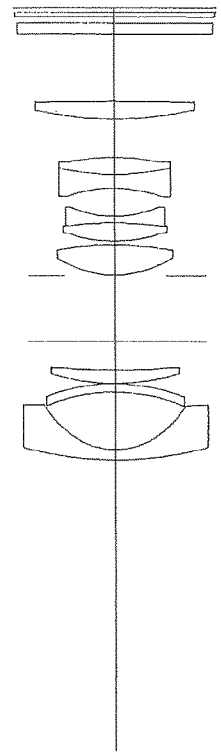
FIG. 9B shows an arrangement upon focusing on a point at an intermediate distance ($\beta=-0.009$)
Figure 9C:
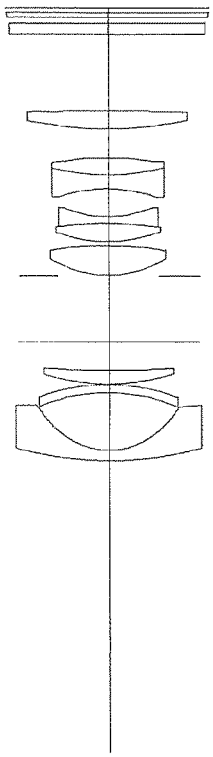
FIG. 9C shows an arrangement upon focusing on a nearest point ($\beta=-0.036$)

Example 5 will be described with reference to FIG. 9, FIG. 10 and Table 5. As illustrated in FIG. 9, the optical system WL5 according to Example 5 has, in order from an object, a first lens group G1 having negative refractive power, a flare-cut stop FS, an aperture stop S, a second lens group G2 having positive refractive power, a third lens group G3 having positive refractive power, and a filter group FL.

The first lens group G1 includes, in order from the object, a negative meniscus lens L11 having a convex surface facing the object, a negative meniscus lens L12 having a concave surface facing the object, and a positive meniscus lens L13 having a convex surface facing the object. The object side and the image side lens surfaces of the negative lens L11 are aspherical.

The second lens group G2 includes, in order from the object, a biconvex positive lens L21, a cemented lens of a biconvex positive lens L22 and a biconcave negative lens L23 and a cemented lens of a biconcave negative lens L24 and a biconvex positive lens L25. The image side lens surface of the positive lens L25 is aspherical.

The third lens group G3 is constituted by a biconvex positive lens L31.

The filter group FL is constituted by a low-pass filter, an infrared cut-off filter or the like, in order to cut off the spatial frequency exceeding the critical resolution of a solid-state picture element (e.g. CCD, CMOS) disposed on the image plane I.

In the optical system WL5 of Example 5 having this configuration, it is preferable that focusing from an object at infinity to an object at a finite distance with about magnification $\beta=-0.036$ is performed by moving the third lens group G3 along the optical axis. It is preferable that focusing on an object at a closer distance with magnification $\beta$ greater than $-0.036$ is performed by moving the second lens group G2 and the third lens group G3 respectively along the optical axis.

Table 5 shows each data value of Example 5. The surface numbers 1 to 22 in Table 5 correspond to each optical surface with the radius of curvatures R1 to R22 shown in FIG. 9 respectively. In Example 5, surface 1, surface 2 and surface 16 are aspherical.

TABLE 5

[Lens Data]

| Surface number | R | D | nd | vd |
|---|---|---|---|---|
| Object surface | ∞ | | | |
| *1 | 2.7352 | 0.0865 | 1.5691 | 71.31 |
| *2 | 0.5942 | 0.4818 | | |
| 3 | −1.5351 | 0.0703 | 1.9459 | 17.98 |
| 4 | −1.6290 | 0.0054 | | |
| 5 | 2.0037 | 0.1074 | 1.7995 | 42.09 |
| 6 | 6.5923 | 0.2432 | | |
| 7 | ∞ | D7 (variable) | | |
| (stop FS) | | | | |
| 8 | ∞ | 0.5475 | | |
| (stop S) | | | | |
| 9 | 0.9412 | 0.2465 | 1.4978 | 82.57 |
| 10 | −3.0012 | 0.0300 | | |
| 11 | 1.2540 | 0.1514 | 1.8160 | 46.59 |
| 12 | −3.3541 | 0.0541 | 1.6259 | 35.72 |
| 13 | 0.9427 | 0.2405 | | |
| 14 | −1.1378 | 0.1110 | 1.7408 | 27.74 |
| 15 | 1.9537 | 0.1395 | 1.8513 | 40.10 |

TABLE 5-continued

| | | | | |
|---|---|---|---|---|
| *16 | −1.8564 | D16 (variable) | | |
| 17 | 3.3216 | 0.1464 | 1.6180 | 63.34 |
| 18 | −27.8378 | D18 (variable) | | |
| 19 | ∞ | 0.0859 | 1.5168 | 64.20 |
| 20 | ∞ | 0.0541 | | |
| 21 | ∞ | 0.0378 | 1.5168 | 64.20 |
| 22 | ∞ | BF | | |
| Image plane | ∞ | | | |

[Aspherical Data]

Surface 1

$\kappa = 1.0000$, A4 = −4.5412E−02, A6 = 2.5782E−02, A8 = 0.0000E+00, A10 = 0.0000E+00

Surface 2

$\kappa = 0.7000$, A4 = −6.7660E−02, A6 = −3.9725E−01, A8 = 6.4185E−01, A10 = −2.2663E+00

Surface 16

$\kappa = 1.0000$, A4 = 4.0710E−01, A6 = 8.1699E−01, A8 = −3.5427E−01, A10 = 3.6897E+00

[Various Data]

| | | | |
|---|---|---|---|
| β | 0.000 | −0.009 | −0.036 |
| f | 1.000 | 0.995 | 0.981 |
| FNO | 2.051 | 0.002 | 0.009 |
| ω | 38.624 | 87.094 | 22.278 |
| Y | 0.783 | 0.783 | 0.783 |
| TL | 3.768 | 3.768 | 3.768 |
| BF | 0.038 | 0.038 | 0.038 |
| BF (air conversion) | 0.702 | 0.732 | 0.815 |

[Variable Surface Distance Data]

| | | | |
|---|---|---|---|
| β | 0.000 | −0.009 | −0.036 |
| D7 | 0.548 | 0.548 | 0.548 |
| D16 | 0.357 | 0.327 | 0.245 |
| D18 | 0.529 | 0.559 | 0.641 |
| BF | 0.038 | 0.038 | 0.038 |

[Conditional Expressions]

fn12 = −44.21690
f = 1.0000
vn12 = 17.98
vp13 = 42.09
Conditional expression (1) (−fn12)/f = 44.217
Conditional expression (2) vp13 − vn12 = 24.11

As Table 5 shows, the optical system WL5 of Example 5 satisfies the conditional expressions (1) and (2).

Figure 10B:
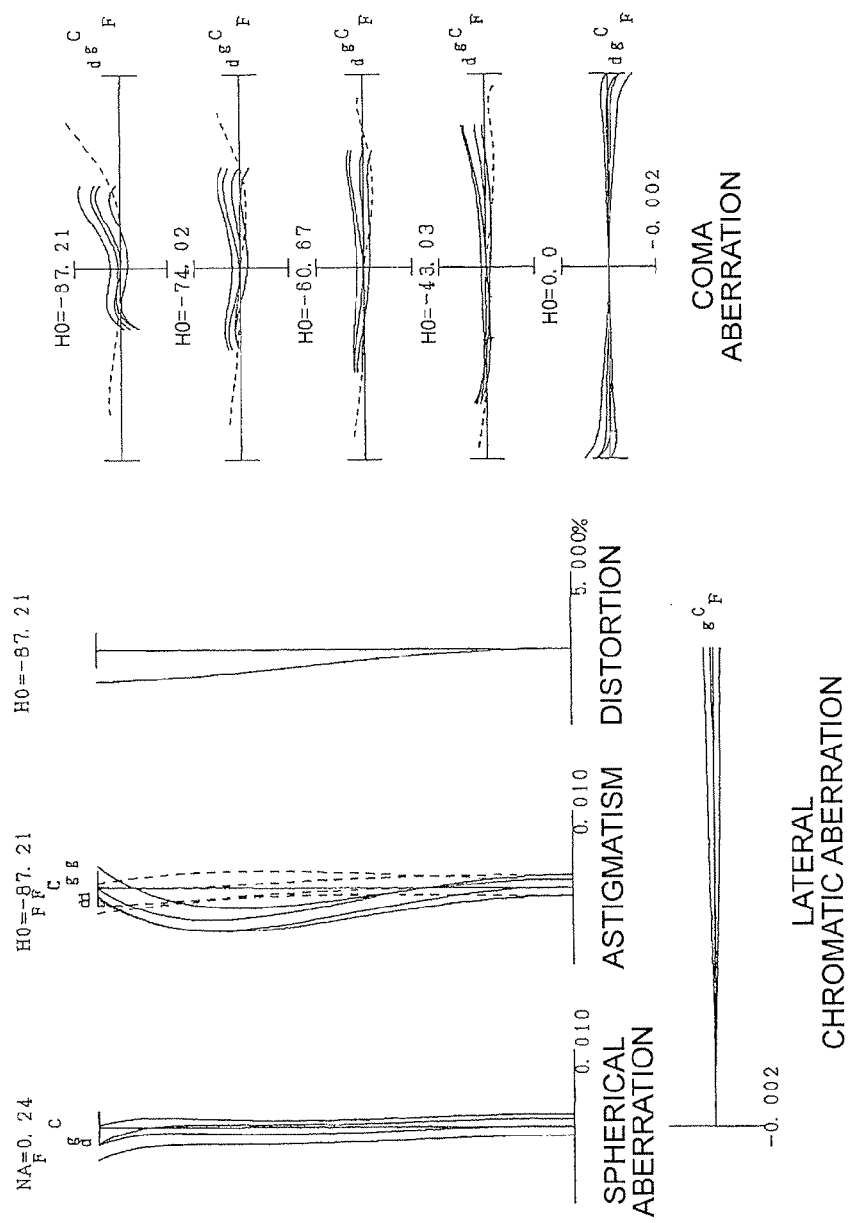
FIG. 10B shows an aberration upon focusing on a point at an intermediate distance ($\beta=-0.009$)
Figure 10C:
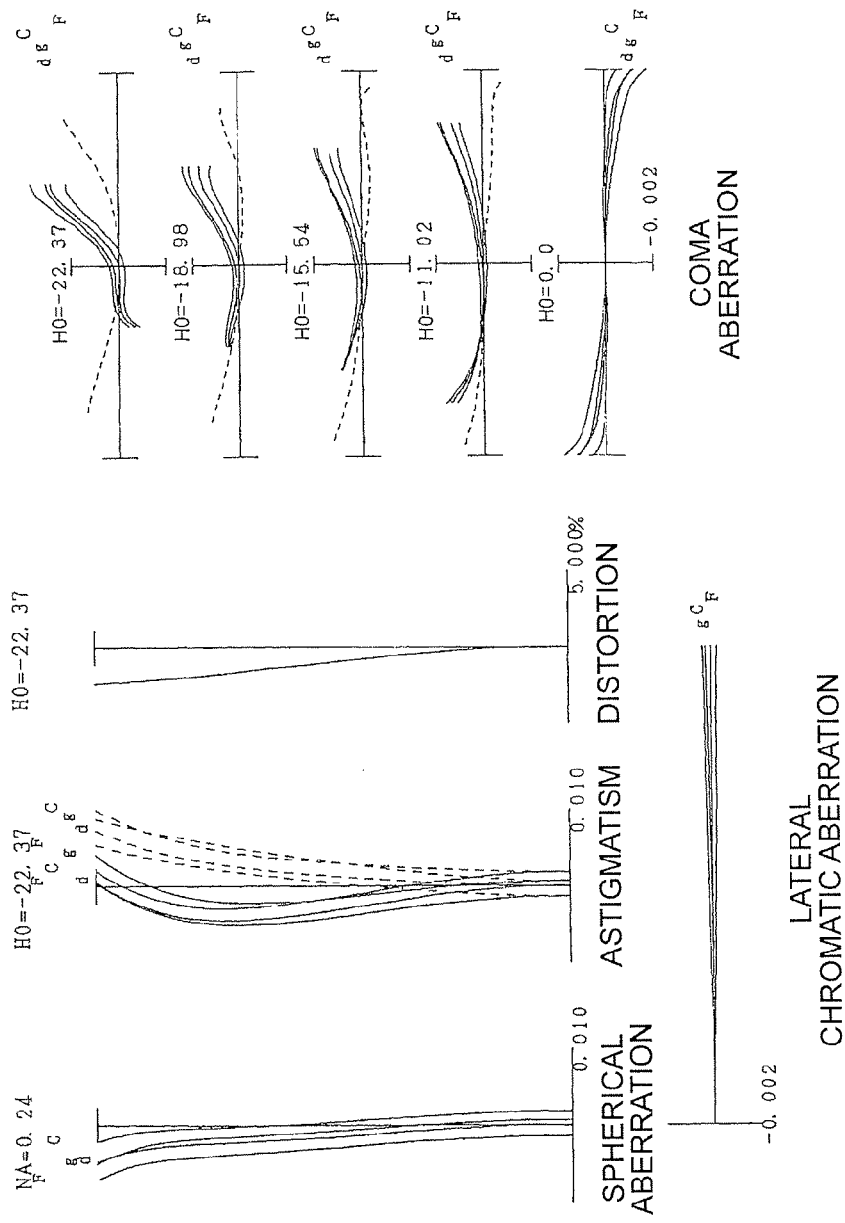
FIG. 10C shows an aberration upon focusing on a nearest point ($\beta=-0.036$)

FIG. 10 are graphs showing various aberrations (spherical aberration, astigmatism, distortion, coma aberration and lateral chromatic aberration) of the optical system WL5 according to Example 5, where FIG. 10A are graphs showing various aberrations upon focusing on infinity ($\beta=0.000$), FIG. 10B are graphs showing various aberrations upon focusing on a point at an intermediate distance ($\beta=-0.009$), and FIG. 10C are graphs showing various aberrations upon focusing on nearest point ($\beta=-0.036$). As each graph showing aberrations in FIG. 10A to FIG. 10C clarifies, various aberrations are corrected satisfactorily, demonstrating that the optical system WL5 according to Example 5 has excellent image forming performance.

(Embodiment 2)

Figure 12A:
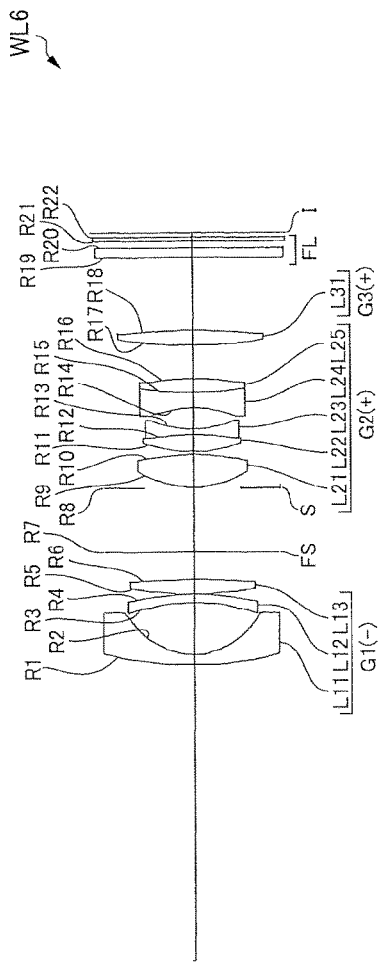
FIG. 12A shows an arrangement upon focusing on infinity ($\beta=0.000$)
Figure 12B:
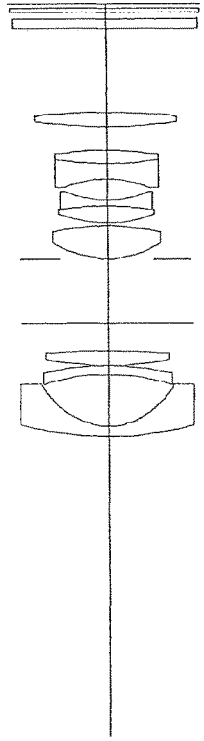
FIG. 12B shows an arrangement upon focusing on a point at an intermediate distance ($\beta=-0.036$)
Figure 12C:
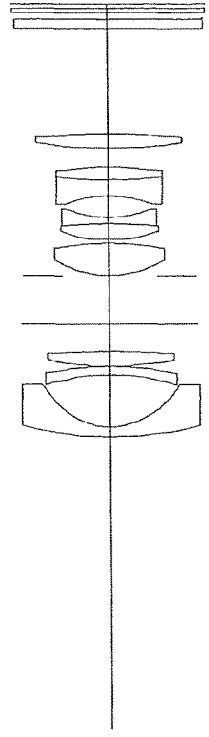
FIG. 12C shows an arrangement upon focusing on a nearest point ($\beta=-0.179$)

As illustrated in FIG. 12, an optical system according to Embodiment 2 has, in order from an object, a first lens group G1 having negative refractive power and a second lens group G2, wherein the first lens group G1 includes, in order from the object, a first lens L11 having negative refractive power, a second lens L12 which has a concave surface facing the object and has negative refractive power, and a third lens L13, and the following conditional expression (3) is satisfied.

$$-23.0<vd3-vd2<24.2 \quad (3)$$

where vd3 denotes an Abbe number of the third lens L13 with respect to the d-line, and vd2 denotes an Abbe number of the second lens L12 with respect to the d-line.

Generally in the design of an imaging optical system, such as a photograph lens, it is difficult to make the angle of view wider and the aperture larger without changing the size of the optical system very much. As the aperture becomes larger, it becomes more difficult to correct spherical aberration, to correct both the meridional coma aberration and the sagittal coma aberration, and to correct both coma aberration and astigmatism. If the angle of view is made wider without increasing the size of the optical system, it becomes difficult to correct spherical aberration, astigmatism and various chromatic aberrations. However in the case of the optical system having the above configuration according to this embodiment, the lens barrel can collapse into the camera when the camera is not used, but the camera can be compact. Further, while implementing a large aperture of about Fno 2.0 and a wide angle of view of about 75°, the sagittal coma aberration can be decreased without worsening the meridional coma aberration.

The conditional expression (3) specifies a difference of the Abbe numbers between the second lens L12 and the third lens L13 constituting the first lens group G1. By satisfying the conditional expression (3), both the longitudinal chromatic aberration and the lateral chromatic aberration can be corrected satisfactorily. If the upper limit value of the conditional expression (3) is exceeded, the Abbe number of the second lens L12 becomes too small with respect to the Abbe number of the third lens L13, which makes it difficult to correct the longitudinal chromatic aberration. If the lower limit value of the conditional expression (3) is not reached, the Abbe number of the second lens L12 becomes too large with respect to the Abbe number of the third lens L13, which makes it difficult to correct the lateral chromatic aberration.

In the optical system according to Embodiment 2, it is preferable that the following conditional expression (4) is satisfied.

$$fL1/fL2<0.2 \quad (4)$$

where fL1 denotes a focal length of the first lens L11, and fL2 denotes a focal length of the second lens L12.

The conditional expression (4) specifies a ratio of the focal length between the first lens L11 and the second lens L12 constituting the first lens group G1. By satisfying the conditional expression (4), coma aberration can be decreased without worsening distortion and curvature of field. If the upper limit value of the conditional expression (4) is exceeded, the refractive power of the second lens L12 becomes too large with respect to the refractive power of the first lens L11. This allows correcting the meridional coma aberration effectively but makes it difficult to correct sagittal coma aberration.

In the optical system according to Embodiment 2, it is preferable that the following conditional expression (5) is satisfied.

$$2.55<(-R21)/R12 \quad (5)$$

where R21 denotes the radius of curvature of the object side surface of the second lens L12, and R12 denotes the radius of curvature of the image side surface of the first lens L11. The radius of curvatures R21 and R12 are positive when the convex surfaces are facing the objects.

The conditional expression (5) specifies the ratio of radius of curvature between the image side surface of the first lens L11 and the object side surface of the second lens L12 constituting the first lens group G1. By satisfying the conditional expression (5), sagittal coma aberration can be decreased without worsening meridional coma aberration. If the lower limit value of the conditional expression (5) is not reached, the absolute value of the radius of curvature of the object side surface of the second lens L12 becomes too large to maintain the refractive power of the second lens L12. This allows correcting the meridional coma aberration effectively, but makes it difficult to correct the sagittal coma aberration.

In the optical system according to Embodiment 2, it is preferable that the third lens L13 constituting the first lens group G1 has positive refractive power. By this configuration, distortion and lateral chromatic aberration can be corrected satisfactorily.

In the optical system according to Embodiment 2, it is preferable that the first lens L11, the second lens L12 and the third lens L13 are all single lenses. By this configuration, distortion and lateral chromatic aberration can be corrected satisfactorily.

In the optical system according to Embodiment 2, it is preferable that the second lens group G2 has positive refractive power. By using a retro focus type optical system, where the lens group having positive refractive power is disposed closer to the image than the first lens group G1 having negative refractive power, compactness with a wide angle of view can be implemented while controlling aberrations.

In the optical system according to Embodiment 2, it is preferable that an aperture stop S is disposed closer to the object than the second lens group G2. By this configuration, distortion and curvature of field can be corrected satisfactorily, while decreasing the effective diameter of the lens closest to the object, that is, the first lens L11 (of the first lens group G1). Furthermore, it is possible to decrease the thickness of the lens barrel to a state where the lens barrel collapses into the camera when the camera is not used, and a slimmer camera can be implemented.

In the optical system according to Embodiment 2, it is preferable that at least one surface of the first lens L11 is aspherical. If an aspherical surface is used for the first lens L11, where abaxial light passes through a position distant from the optical axis, then curvature of field and astigmatism can be corrected satisfactorily, and aberrations of the entire optical system can be corrected satisfactorily. Normally if achieving a wider angle of view is attempted in an optical system of which the first lens group G1 closest to the object has negative refractive power, negative refractive power of the first lens group G1 must be increased, which makes the correction of aberrations difficult. However if at least one surface of the first lens L11 constituting the first lens group G1 is aspherical, as in the case of the optical system of Embodiment 2, this problem can be solved. Aberrations can be corrected by increasing a number of lenses constituting the first lens group G1, but if a number of lenses of the first lens group G1 increases, the thickness of the lens barrel increases when a camera is not used, that is, when the lens barrel is collapsed, which makes downsizing impossible.

According to the above mentioned optical system of Embodiment 2, an optical system where the lens barrel can collapse into the camera when the camera is not used, but where the camera is still compact, and has a wide angle of view (angle of view: about) 75° and a large aperture (Fno: about 2.0), can be implemented.

Figure 18:
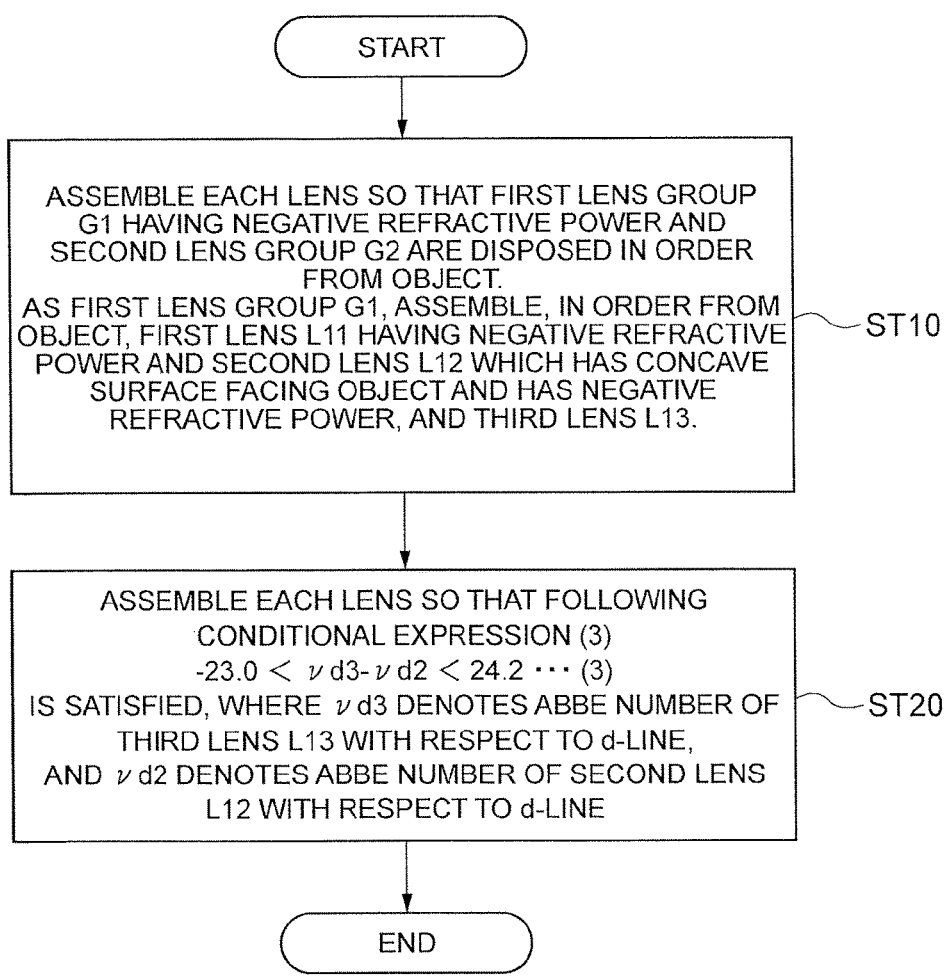
FIG. 18 is a flow chart depicting a method for manufacturing the optical system according to Embodiment 2.

Now a method for manufacturing the optical system will now be described with reference to FIG. 18. First the first lens group G1 and the second lens group G2 are assembled in a lens barrel in order from an object (step ST10). In this step, as the first lens group G1, the first lens L11 having negative refractive power, the second lens L12 which has a concave surface facing the object and has negative refractive power, and the third lens L13, are disposed in order from the object. Each lens is assembled in the lens barrel so that the following conditional expression (3) is satisfied, where vd3 denotes an Abbe number of the third lens L13 with respect to the d-line, and vd2 denotes an Abbe number of the second lens L12 with respect to the d-line (step ST20).

$$-23.0 < vd3 - vd2 < 24.2 \tag{3}$$

An example of the lens configuration according to Embodiment 2 is: as illustrated in FIG. 12, the first lens group G1 includes, in order from the object, a negative meniscus lens L11 having a convex surface facing the object (corresponding to the first lens), a negative meniscus lens L12 having a concave surface facing the object (corresponding to the second lens), and a biconvex positive lens L13 (corresponding to the third lens), so that the entire lens group has negative refractive power. The second lens group G2 includes, in order from the object, a biconvex positive lens L21, a cemented lens of a biconvex positive lens L22 and a biconcave negative lens L23, and a cemented lens of a biconcave negative lens L24 and a biconvex positive lens L25, so that the entire lens group has positive refractive power. The third lens group G3 includes a biconvex positive lens L31 so that the entire lens group has positive refractive power.

According to the above mentioned method for manufacturing the optical system according to Embodiment 2, an optical system where the lens barrel can collapse into the camera when the camera is not used, but where the camera is still compact, and has a wide angle of view (angle of view: about 75°) and a large aperture (Fno: about 2.0), can be implemented.

Each example of Embodiment 2 will now be described with reference to the drawings. Table 6 to Table 8 shown below list the data of Example 6 to Example 8.

In each example, the aberration characteristics are calculated with respect to the C-line (wavelength: 656.2730 nm), the d-line (wavelength: 587.5620 nm), the F-line (wavelength: 486.1330 nm), and the g-line (wavelength: 435.8350 nm).

In [Lens Data] in each table, the surface number is the sequential number of the optical surface counted from the object side in the light traveling direction, R denotes the radius of curvature of each optical surface, D denotes a distance from each optical surface to the next optical surface (or image plane) on the optical axis, nd denotes a refractive index of the material of the optical member with respect to the d-line, and vd denotes an Abbe number of the material of the optical member with respect to the d-line. The Object surface indicates the surface of the object, (variable) indicates a variable surface distance, "∞" in the radius of curvature indicates a plane or an aperture, (stop FS) indicates a flare-cut stop FS, (stop S) indicates an aperture stop S, and image plane indicates an image plane I. The refractive index of air "1.000000" is omitted. If the optical surface is aspherical, * is affixed to the surface number, and the paraxial radius of curvature is shown in the column of the radius of curvature R.

In [Aspherical Data] in each table, a form of the aspherical surface shown in [Lens Data] is indicated by the following expression (a). X(y) denotes a distance in the optical axis direction from a tangential plane at a vertex of the aspherical surface to a position on the aspherical surface at height y, r denotes a radius of curvature (paraxial radius of curvature) of the reference spherical surface, K denotes a conical coefficient, and Ai denotes an aspherical coefficient of the i-th order. "E-n" indicates "×10$^{-n}$". For example, 1.234E-05=1.234×10$^{-5}$.

$$X(y)=(y^2/r)/\{1+(1-\kappa \times y^2/r2)^{1/2}\}+A4 \times y^4+A6 \times y^6+A8 \times y^8+A10 \times y^{10} \tag{a}$$

In [Various Data], β denotes a photographic magnification at each focal position, f denotes a focal length of the entire optical system, FNO denotes an F number, ω denotes a half angle of view (maximum incident angle, unit: °), Y denotes an image height, TL denotes a total length of the optical system, Bf denotes a distance from an image side surface of an optical member disposed closest to the image to a paraxial image plane, and Bf (air conversion) denotes a distance from the last optical surface to the paraxial image plane converted into air.

In [Variable Surface Distance Data], β denotes a photographic magnification at each focal position, and Di denotes a variable surface distance of the i-th surface.

In [Conditional Expression], a value corresponding to each conditional expression (3) to (5) is shown.

In all the data values herein below, "mm" is normally used as the unit of focal length f, radius of curvature R, surface distance D and other lengths if not otherwise specified, but the unit is not limited to "mm", and another appropriate unit may be used, since an equivalent optical performance is obtained even if the optical system is proportionally expanded or proportionally reduced.

This description on the table is the same for all examples, and is therefore omitted herein below.

Example 6

Example 6 will be described with reference to FIG. 12, FIG. 13 and Table 6. As illustrated in FIG. 12, the optical system WL6 according to Example 6 has, in order from an object, a first lens group G1 having negative refractive power, a flare-cut stop FS, an aperture stop S, a second lens group G2 having positive refractive power, a third lens group G3 having positive refractive power, and a filter group FL.

The first lens group G1 includes, in order from the objet, a negative meniscus lens L11 having a convex surface facing the object, a negative meniscus lens L12 having a concave surface facing the object, and a biconvex positive lens L13. The image side lens surface of the negative lens L11 is aspherical.

The second lens group G2 includes, in order from the object, a biconvex positive lens L21, a cemented lens of a biconvex positive lens L22 and a biconcave negative lens L23 and a cemented lens of a biconcave negative lens L24 and a biconvex positive lens L25. The image side lens surface of the positive lens L25 is aspherical.

The third lens group G3 is constituted by a biconvex positive lens L31.

The filter group FL is constituted by a low-pass filter, an infrared cut-off filter or the like, in order to cut off the spatial frequency exceeding the critical resolution of a solid-state picture element (e.g. CCD, CMOS) disposed on the image plane I.

In the optical system WL6 of Example 6 having this configuration, it is preferable that focusing from an object at infinity to an object at a finite distance with about magnification β=−0.036 is performed by moving the third lens group G3 along the optical axis. It is preferable that focusing on an object at a closer distance with magnification β greater than −0.036 is performed by moving the second lens group G2 and the third lens group G3 respectively along the optical axis.

Table 6 shows each data value of Example 6. The surface numbers 1 to 22 in Table 6 correspond to each optical surface with the radius of curvatures R1 to R22 shown in FIG. 12 respectively. In Example 6, surface 2 and surface 16 are aspherical.

TABLE 6

[Lens Data]

| Surface number | R | D | nd | vd |
|---|---|---|---|---|
| Object surface | ∞ | | | |
| 1 | 3.0675 | 0.0865 | 1.5889 | 61.18 |
| *2 | 0.6059 | 0.4621 | | |
| 3 | −1.7942 | 0.0703 | 1.6477 | 33.72 |
| 4 | −2.6821 | 0.0054 | | |
| 5 | 2.8738 | 0.1270 | 1.9108 | 35.25 |
| 6 | −9.2330 | 0.2432 | | |
| 7 (stop FS) | ∞ | D7 (variable) | | |
| 8 (stop S) | ∞ | 0.0054 | | |
| 9 | 0.9156 | 0.2795 | 1.4978 | 82.57 |
| 10 | −2.5496 | 0.0300 | | |
| 11 | 1.3142 | 0.1424 | 1.8160 | 46.59 |
| 12 | −3.3908 | 0.0540 | 1.6398 | 34.55 |
| 13 | 0.9273 | 0.1943 | | |
| 14 | −1.1082 | 0.1395 | 1.7408 | 27.74 |
| 15 | 3.2628 | 0.1170 | 1.8513 | 40.10 |
| *16 | −1.8675 | D16 (variable) | | |
| 17 | 4.0834 | 0.1277 | 1.6180 | 63.34 |
| 18 | −6.8503 | D18 (variable) | | |
| 19 | ∞ | 0.0859 | 1.5168 | 64.20 |
| 20 | ∞ | 0.0541 | | |
| 21 | ∞ | 0.0378 | 1.5168 | 64.20 |
| 22 | ∞ | BF | | |
| Image plane | ∞ | | | |

[Aspherical Data]

Surface 2

κ = 0.7323, A4 = −3.7914E−02, A6 = −3.4715E−01, A8 = 7.9334E−01, A10 = −2.7509E+00

Surface 16

κ = 1.0000, A4 = 3.9172E−01, A6 = 7.6310E−01, A8 = −6.1183E−02, A10 = 4.3105E+00

[Various Data]

| β | 0.000 | −0.036 | −0.179 |
|---|---|---|---|
| f | 1.000 | 0.983 | 1.011 |
| FNO | 2.057 | 2.056 | 2.219 |
| ω | 38.624 | 22.289 | 4.452 |
| Y | 0.783 | 0.783 | 0.783 |
| TL | 3.792 | 3.792 | 3.762 |
| BF | 0.038 | 0.038 | 0.038 |
| BF (air conversion) | 0.812 | 0.905 | 1.090 |

[Variable Surface Distance Data]

| β | 0.000 | −0.036 | −0.179 |
|---|---|---|---|
| D7 | 0.559 | 0.559 | 0.413 |
| D16 | 0.293 | 0.201 | 0.162 |
| D18 | 0.639 | 0.731 | 0.916 |
| BF | 0.038 | 0.038 | 0.038 |

[Conditional Expressions]

vd2 = 33.72
vd3 = 35.25
fL1 = −1.3011
fL2 = −8.9628
R12 = 0.6059
R21 = −1.7942
Conditional expression (3) vd3 − vd2 = −1.53
Conditional expression (4) fL1/fL2 = 0.1452
Conditional expression (5) (−R21)/R12 = 2.889

As Table 6 shows, the optical system WL6 of Example 6 satisfies the conditional expressions (3) to (5).

Figure 13B:
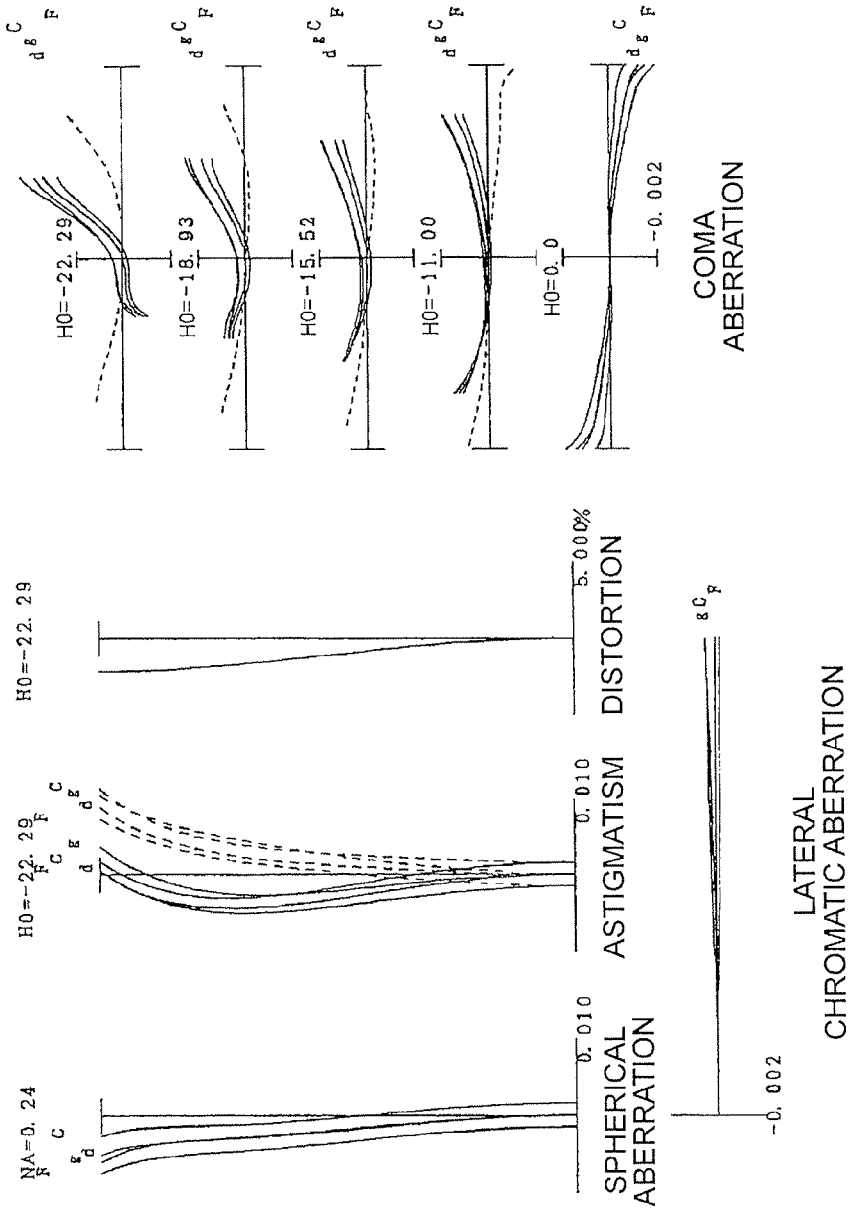
FIG. 13B shows an aberration upon focusing on a point at an intermediate distance ($\beta=-0.036$)
Figure 13C:
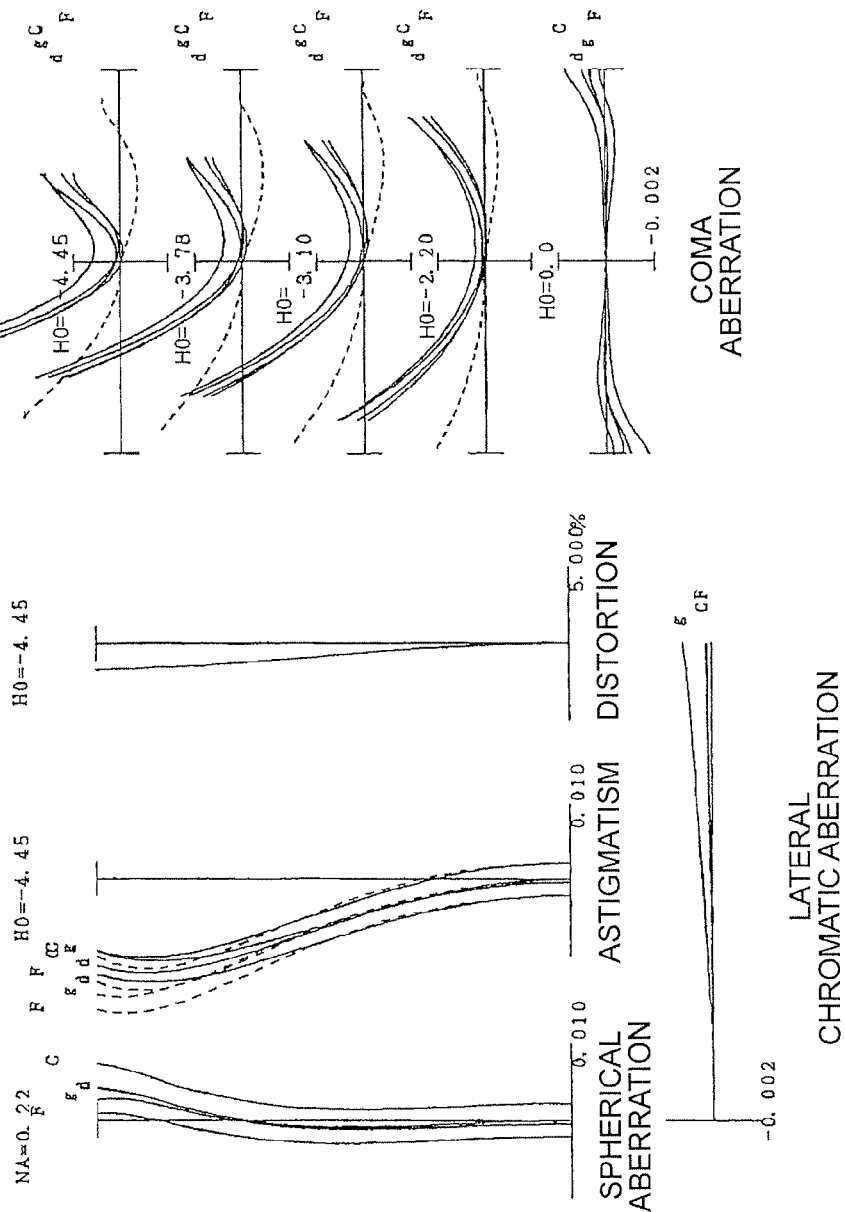
FIG. 13C shows an aberration upon focusing on a nearest point ($\beta=-0.179$)

FIG. 13 are graphs showing various aberrations (spherical aberration, astigmatism, distortion, coma aberration and lateral chromatic aberration) of the optical system WL6 according to Example 6, where FIG. 13A are graphs showing various aberrations upon focusing on infinity (β=0.000), FIG. 13B are graphs showing various aberrations upon focusing on a point at an intermediate distance (β=−0.036), and FIG. 13C are graphs showing various aberrations upon focusing on a nearest point (β=−0.179).

In each graph showing aberrations, FNO denotes an F number, NA denotes numeral aperture, A denotes a half angle of view (unit: °) with respect to each image height, and HO denotes object height. d indicates aberration at the d-line, g indicates aberration at the g-line, C indicates aberration at the C-line, and F indicates aberration at the F-line. In graphs showing astigmatism, the solid line indicates the sagittal image surface, and the broken line indicates the meridional image surface. In graphs showing coma aberration, the solid line indicates the meridional coma aberration, the dotted line indicates the sagittal coma aberration, and the dotted line to the right of the origin shows the sagittal coma aberration that is generated in the meridional direction with respect to the d-line, and the dotted line to the left of the origin indicates the sagittal coma aberration that is generated in the sagittal direction with respect of the d-line. The reference symbols of this example are the same for graphs showing various aberrations in each example described later.

As each graph showing aberrations in FIG. 13A to FIG. 13C clarifies, various aberrations are corrected satisfactorily, demonstrating that the optical system WL6 according to Example 6, has excellent image forming performance.

Example 7

Figure 14A:
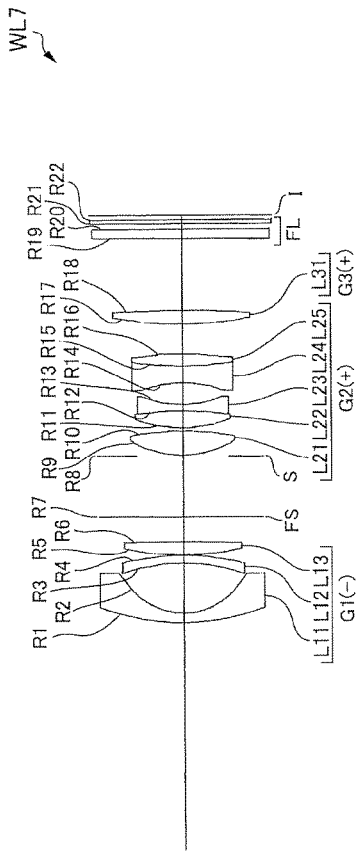
FIG. 14A shows an arrangement upon focusing on infinity ($\beta=0.0000$)
Figure 14B:
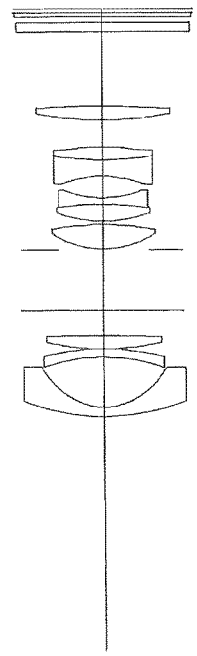
FIG. 14B shows an arrangement upon focusing on a point at an intermediate distance ($\beta=-0.009$)
Figure 14C:
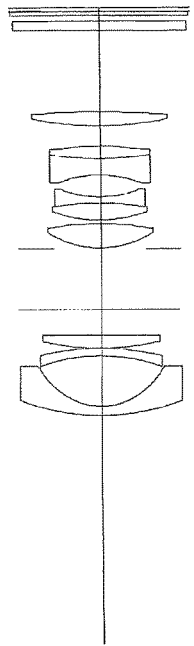
FIG. 14C shows an arrangement upon focusing on a nearest point ($\beta=-0.036$)

Example 7 will be described with reference to FIG. 14, FIG. 15 and Table 7. As illustrated in FIG. 14, the optical system WL7 according to Example 7 has, in order from an object, a first lens group G1 having negative refractive power, a flare-cut stop FS, an aperture stop S, a second lens group G2 having positive refractive power, a third lens group G3 having positive refractive power, and a filter group FL.

The first lens group G1 includes, in order from the objet, a negative meniscus lens L11 having a convex surface facing the object, a negative meniscus lens L12 having a concave surface facing the object, and a biconvex positive lens L13. The image side lens surface of the negative lens L11 is aspherical.

The second lens group G2 includes, in order from the Object, a biconvex positive lens L21, a cemented lens of a biconvex positive lens L22 and a biconcave negative lens L23 and a cemented lens of a biconcave negative lens L24 and a biconvex positive lens L25. The image side lens surface of the positive lens L25 is aspherical.

The third lens group G3 is constituted by a biconvex positive lens L31.

The filter group FL is constituted by a low-pass filter, an infrared cut-off filter or the like, in order to cut off the spatial frequency exceeding the critical resolution of a solid-state picture element (e.g. CCD, CMOS) disposed on the image plane I.

In the optical system WL7 of Example 7 having this configuration, it is preferable that focusing from an object at infinity to an object at a finite distance with about magnification $\beta=-0.036$ is performed by moving the third lens group G3 along the optical axis. It is preferable that focusing on an object at a closer distance with magnification $\beta$ greater than $-0.036$ is performed by moving the second lens group G2 and the third lens group G3 respectively along the optical axis.

Table 7 shows each data value of Example 7. The surface numbers 1 to 22 in Table 7 correspond to each optical surface with the radius of curvatures R1 to R22 shown in FIG. 14 respectively. In Example 7, surface 2 and surface 16 are aspherical.

TABLE 7

[Lens Data]

| Surface number | R | D | nd | vd |
|---|---|---|---|---|
| Object surface | ∞ | | | |
| 1 | 2.1637 | 0.0865 | 1.6516 | 58.57 |
| *2 | 0.6042 | 0.4694 | | |
| 3 | −1.7507 | 0.0703 | 1.6700 | 57.35 |
| 4 | −2.5109 | 0.0054 | | |
| 5 | 2.4999 | 0.1198 | 1.9108 | 35.25 |
| 6 | −52.2956 | 0.2432 | | |
| 7 (stop FS) | ∞ | D7 (variable) | | |
| 8 (stop S) | ∞ | 0.0054 | | |
| 9 | 0.9370 | 0.2274 | 1.4978 | 82.57 |
| 10 | −2.6585 | 0.0300 | | |
| 11 | 1.2910 | 0.1576 | 1.8160 | 46.59 |
| 12 | −2.8071 | 0.0541 | 1.6398 | 34.55 |
| 13 | 0.9366 | 0.2032 | | |
| 14 | −1.1194 | 0.1622 | 1.7408 | 27.74 |
| 15 | 3.0615 | 0.1191 | 1.8513 | 40.10 |
| *16 | −1.9609 | D16 (variable) | | |
| 17 | 3.3931 | 0.1295 | 1.6180 | 63.34 |
| 18 | −9.4947 | D18 (variable) | | |
| 19 | ∞ | 0.0859 | 1.5168 | 64.20 |
| 20 | ∞ | 0.0541 | | |
| 21 | ∞ | 0.0378 | 1.5168 | 64.20 |
| 22 | ∞ | BF | | |
| Image plane | ∞ | | | |

[Aspherical Data]

Surface 2

$\kappa = 0.7466$, A4 = −2.9535E−02, A6 = −3.0881E−01, A8 = 7.8703E−01, A10 = −2.6992E+00

Surface 16

$\kappa = 1.0000$, A4 = 3.8500E−01, A6 = 6.8014E−01, A8 = 1.3926E−01, A10 = 2.9104E+00

TABLE 7-continued

[Various Data]

| $\beta$ | 0.000 | −0.009 | −0.036 |
|---|---|---|---|
| f | 1.000 | 0.996 | 0.984 |
| FNO | 2.051 | 0.002 | 0.009 |
| ω | 38.624 | 87.096 | 22.281 |
| Y | 0.783 | 0.783 | 0.783 |
| TL | 3.820 | 3.820 | 3.820 |
| BF | 0.378 | 0.378 | 0.378 |
| BF (air conversion) | 1.189 | 1.212 | 1.276 |

[Variable Surface Distance Data]

| $\beta$ | 0.000 | −0.009 | −0.036 |
|---|---|---|---|
| D7 | 0.569 | 0.569 | 0.569 |
| D16 | 0.277 | 0.254 | 0.190 |
| D18 | 0.675 | 0.698 | 0.762 |
| BF | 0.378 | 0.378 | 0.378 |

[Conditional Expressions]

vd2 = 57.35
vd3 = 35.25
fL1 = −1.3152
fL2 = −8.9629
R12 = 0.6042
R21 = −1.7507
Conditional expression (3) vd3 − vd2 = −22.10
Conditional expression (4) fL1/fL2 = 0.1467
Conditional expression (5) (−R21)/R12 = 2.898

As Table 7 shows, the optical system WL7 of Example 7 satisfies the conditional expressions (3) to (5).

Figure 15B:
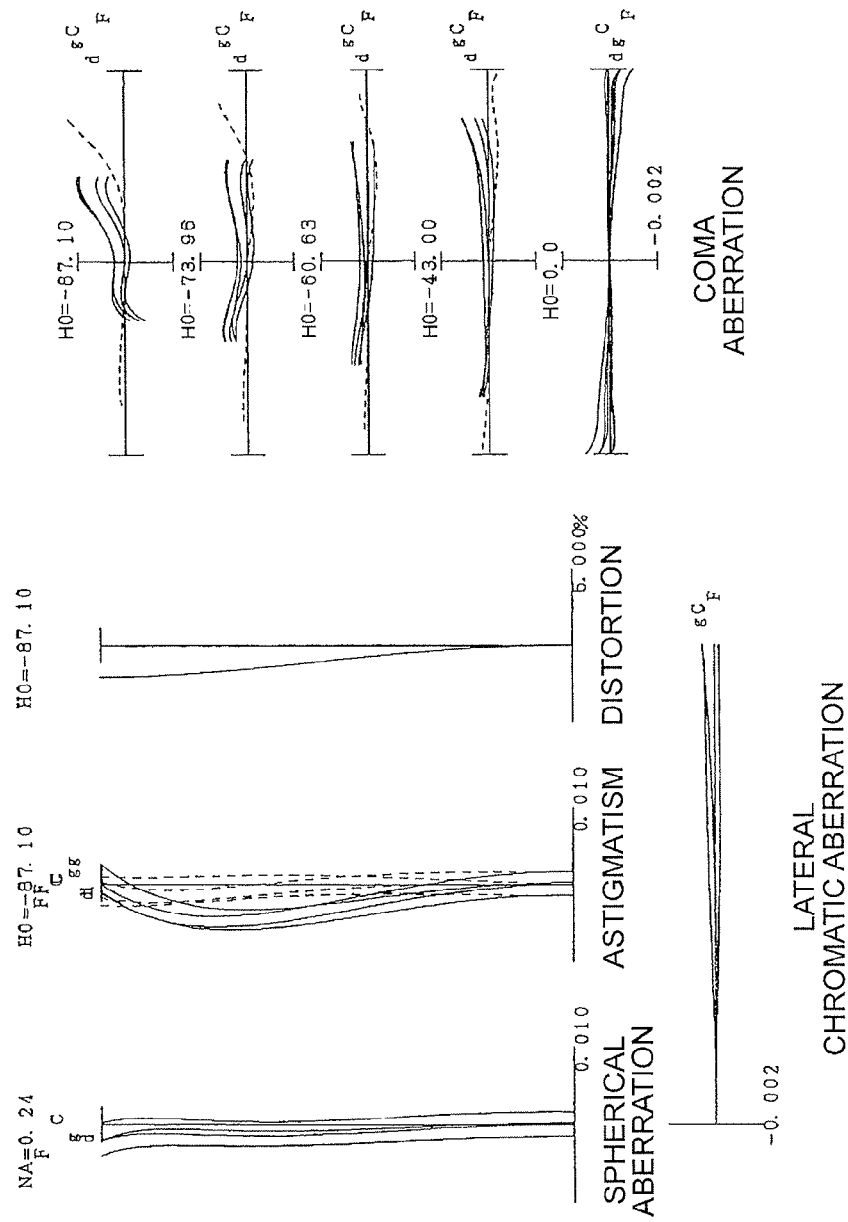
FIG. 15B shows an Aberration upon focusing on a point at an intermediate distance ($\beta=-0.009$)
Figure 15C:
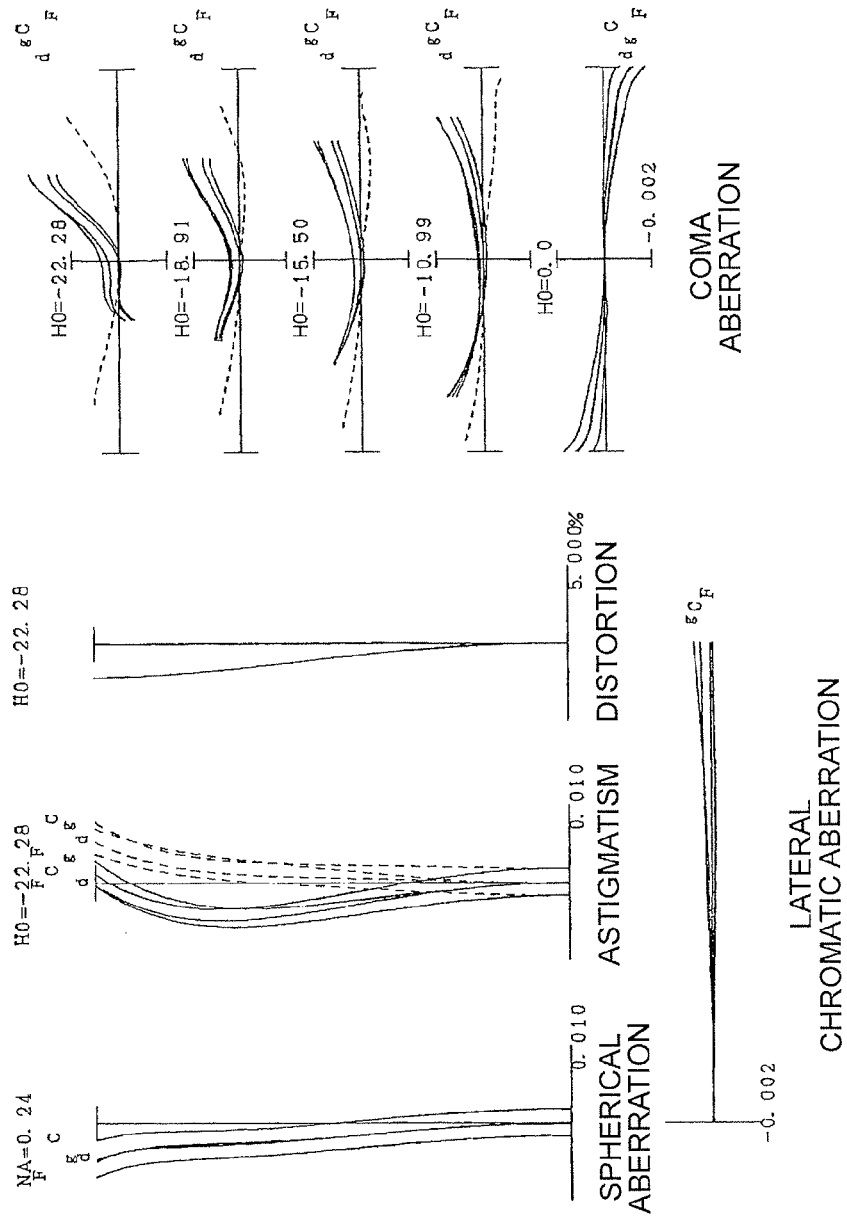
FIG. 15C shows an aberration upon focusing on a nearest point ($\beta=\mathbf{-0.036}$)

FIG. 15 are graphs showing various aberrations (spherical aberration, astigmatism, distortion, coma aberration and lateral chromatic aberration) of the optical system WL7 according to Example 7, where FIG. 15A are graphs showing various aberrations upon focusing on infinity ($\beta=0.000$), FIG. 13B are graphs showing various aberrations upon focusing on a point at an intermediate distance ($\beta=-0.009$), and FIG. 15C are graphs showing various aberrations upon focusing on a nearest point ($\beta=-0.036$).

As each graph showing aberrations in FIG. 15A to FIG. 15C clarifies, various aberrations are corrected satisfactorily, demonstrating that the optical system WL7 according to Example 7, has excellent image forming performance.

Example 8

Figure 16A:
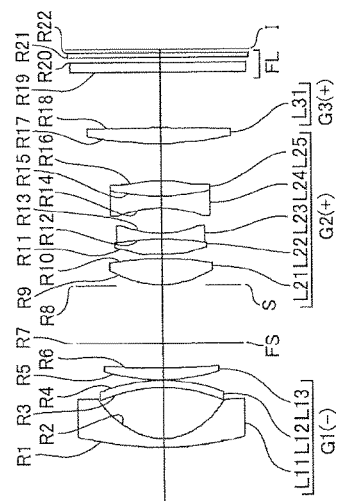
FIG. 16A shows an arrangement upon focusing on infinity ($\beta=0.000$)
Figure 16B:
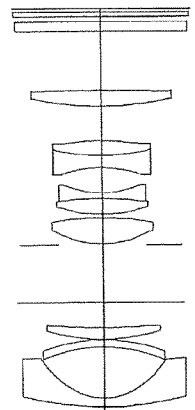
FIG. 16B shows an arrangement upon focusing on a point at an intermediate distance ($\beta=-0.009$)
Figure 16C:
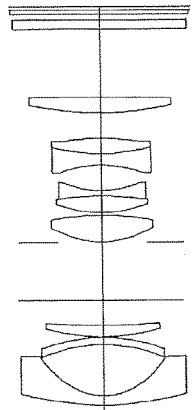
FIG. 16C shows an arrangement upon focusing on a nearest point ($\beta=-0.036$)

Example 8 will be described with reference to FIG. 16, FIG. 17 and Table 8. As illustrated in FIG. 16, the optical system WL8 according to Example 8 has, in order from an object, a first lens group G1 having negative refractive power, a flare-cut stop FS, an aperture stop S, a second lens group G2 having positive refractive power, a third lens group G3 having positive refractive power, and a filter group FL.

The first lens group G1 includes, in order from the object, a negative meniscus lens L11 having a convex surface facing the object, a negative meniscus lens L12 having a concave surface facing the object, and a positive meniscus lens L13 having a convex surface facing the object. The object side and the image side lens surfaces of the negative lens L11 are aspherical.

The second lens group G2 includes, in order from the object, a biconvex positive lens L21, a cemented lens of a biconvex positive lens L22 and a biconcave negative lens L23 and a cemented lens of a biconcave negative lens L24 and a biconvex positive lens L25. The image side lens surface of the positive lens L25 is aspherical.

The third lens group G3 is constituted by a biconvex positive lens L31.

The filter group FL is constituted by a low-pass filter, an infrared cut-off filter or the like, in order to cut off the spatial frequency exceeding the critical resolution of a solid-state picture element (e.g. CCD, CMOS) disposed on the image plane I.

In the optical system WL8 of Example 8 having this configuration, it is preferable that focusing from an object at infinity to an object at a finite distance with about magnification β=−0.036 is performed by moving the third lens group G3 along the optical axis. It is preferable that focusing on an object at a closer distance with magnification β greater than −0.036 is performed by moving the second lens group G2 and the third lens group G3 respectively along the optical axis.

Table 8 shows each data value of Example 8. The surface numbers 1 to 22 in Table 8 correspond to each optical surface with the radius of curvatures R1 to R22 shown in FIG. 16 respectively. In Example 8, surface 1, surface 2 and surface 16 are aspherical.

TABLE 8

[Lens Data]

| Surface number | R | D | nd | vd |
|---|---|---|---|---|
| Object surface | ∞ | | | |
| *1 | 2.7352 | 0.0865 | 1.5691 | 71.31 |
| *2 | 0.5942 | 0.4818 | | |
| 3 | −1.5351 | 0.0703 | 1.9459 | 17.98 |
| 4 | −1.6290 | 0.0054 | | |
| 5 | 2.0037 | 0.1074 | 1.7995 | 42.09 |
| 6 | 6.5923 | 0.2432 | | |
| 7 (stop FS) | ∞ | D7 (variable) | | |
| 8 (stop S) | ∞ | 0.5475 | | |
| 9 | 0.9412 | 0.2465 | 1.4978 | 82.57 |
| 10 | −3.0012 | 0.0300 | | |
| 11 | 1.2540 | 0.1514 | 1.8160 | 46.59 |
| 12 | −3.3541 | 0.0541 | 1.6259 | 35.72 |
| 13 | 0.9427 | 0.2405 | | |
| 14 | −1.1378 | 0.1110 | 1.7408 | 27.74 |
| 15 | 1.9537 | 0.1395 | 1.8513 | 40.10 |
| *16 | −1.8564 | D16 (variable) | | |
| 17 | 3.3216 | 0.1464 | 1.6180 | 63.34 |
| 18 | −27.8378 | D18 (variable) | | |
| 19 | ∞ | 0.0859 | 1.5168 | 64.20 |
| 20 | ∞ | 0.0541 | | |
| 21 | ∞ | 0.0378 | 1.5168 | 64.20 |
| 22 | ∞ | BF | | |
| Image plane | ∞ | | | |

[Aspherical Data]

Surface 1

κ = 1.0000, A4 = −4.5412E−02, A6 = 2.5782E−02, A8 = 0.0000E+00, A10 = 0.0000E+00

Surface 2

κ = 0.7000, AA = −6.7660E−02, A6 = −3.9725E−01, A8 = 6.4185E−01, A10 = −2.2663E+00

Surface 16

κ = 1.0000, A4 = 4.0710E−01, A6 = 8.1699E−01, A8 = −3.5427E−01, A10 = 3.6897E+00

[Various Data]

| β | 0.000 | −0.009 | −0.036 |

TABLE 8-continued

| f | 1.000 | 0.995 | 0.981 |
|---|---|---|---|
| FNO | 2.051 | 0.002 | 0.009 |
| ω | 38.624 | 87.094 | 22.278 |
| Y | 0.783 | 0.783 | 0.783 |
| TL | 3.768 | 3.768 | 3.768 |
| BF | 0.038 | 0.038 | 0.038 |
| BF (air conversion) | 0.702 | 0.732 | 0.815 |

[Variable Surface Distance Data]

| β | 0.000 | −0.009 | −0.036 |
|---|---|---|---|
| D7 | 0.548 | 0.548 | 0.548 |
| D16 | 0.357 | 0.327 | 0.245 |
| D18 | 0.529 | 0.559 | 0.641 |
| BF | 0.378 | 0.378 | 0.378 |

[Conditional Expressions]

vd2 = 17.98
vd3 = 42.09
fL1 = −1.3536
fL2 = −44.2169
R12 = 0.5942
R21 = −1.5351
Conditional expression (3) vd3 − vd2 = 24.110
Conditional expression (4) fL1/fL2 = 0.0306
Conditional expression (5) (−R21)/R12 = 2.584

As Table 8 shows, the optical system WL8 of Example 8 satisfies the conditional expressions (3) to (5).

Figure 17A:
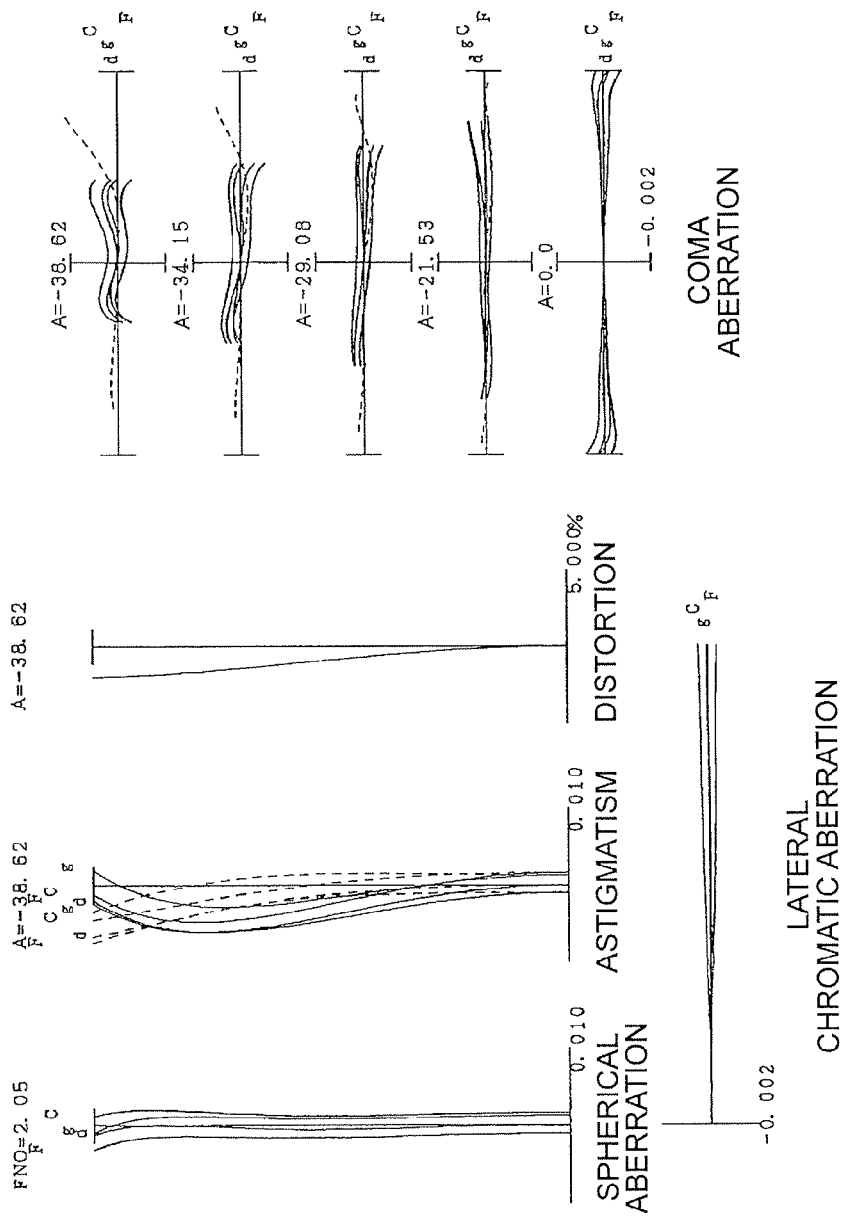
FIG. 17A shows an aberration upon focusing on infinity (β=0.000)
Figure 17C:
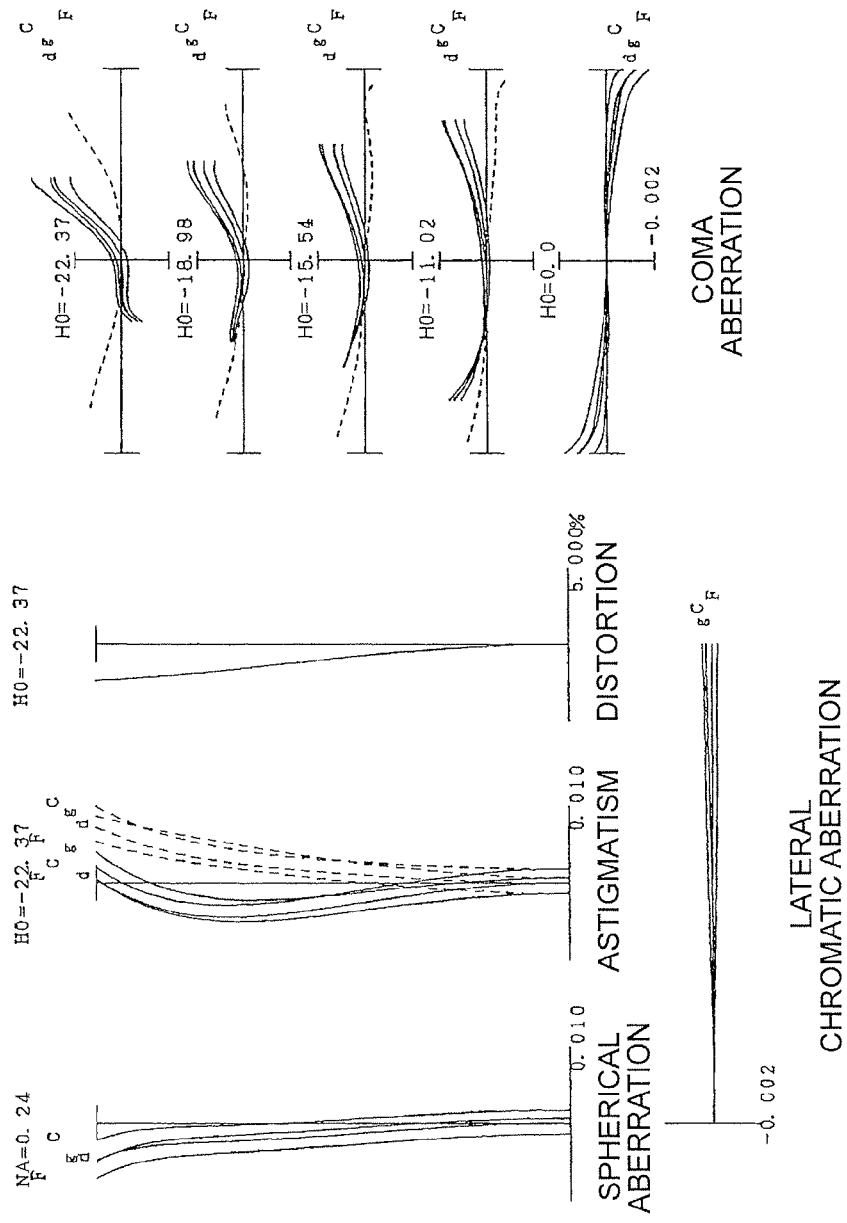
FIG. 17C shows an aberration upon focusing on a nearest point (β=−0.036)

FIG. 17 are graphs showing various aberrations (spherical aberration, astigmatism, distortion, coma aberration and lateral chromatic aberration) of the optical system WL8 according to Example 8, where FIG. 17A are graphs showing various aberrations upon focusing on infinity (β=0.000), FIG. 17B are graphs showing various aberrations upon focusing on a point at an intermediate distance (β=−0.009), and FIG. 17C are graphs showing various aberrations upon focusing on a nearest point (β=−0.036).

As each graph showing aberrations in FIG. 17A to FIG. 17C clarifies, various aberrations are corrected satisfactorily, demonstrating that the optical system WL8 according to Example 8, has excellent image forming performance.

Now a digital still camera (optical apparatus) including the optical system according to Embodiment 1 or 2 will be described. Here the case of including the optical system WL1 according to Example 1 (see FIG. 1) will be described, but description is applicable to other examples as well.

Figure 19A:
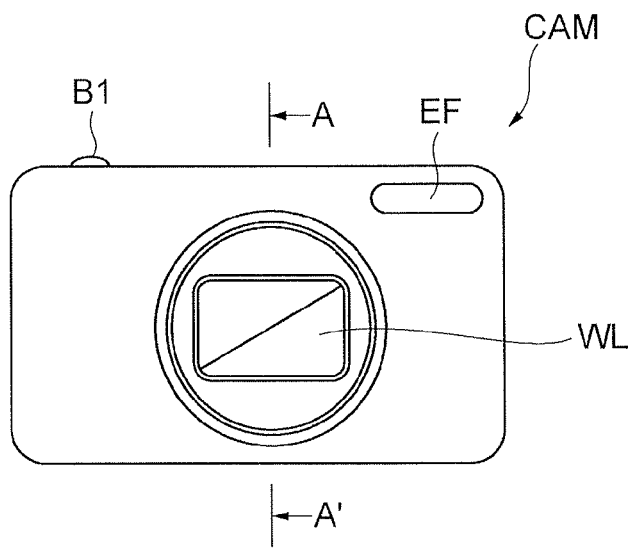
FIG. 19A is a front view and FIG. 19B is a rear view.
Figure 19B:
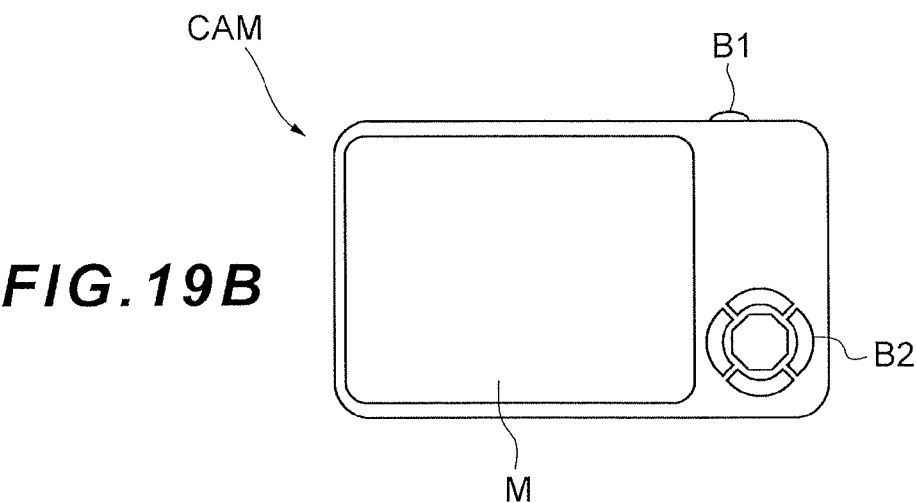

FIG. 19 and FIG. 20 show a configuration of a digital still camera CAM (optical apparatus) including the optical system WL1 according to Example 1 as an image capturing lens WL. In the digital still camera CAM, if a power button (not illustrated) is pressed, a shutter (not illustrated) of the image capturing lens WL is opened, and light from an object is collected by the lens, and forms an image on a picture element C (e.g. CCD, CMOS) disposed on the image plane I (see FIG. 1). The object image formed on the picture element C is displayed on a liquid crystal monitor M disposed on the rear face of the digital still camera CAM. The user determines a composition while viewing the liquid crystal monitor M, then presses a release button B1 to photograph the object image using the picture element C, and records and stores the image in a memory (not illustrated).

In the camera CAM, an auxiliary light emitting unit EF that transmits auxiliary light when an object appears dark, a function button B2 that is used to set various conditions of the digital still camera CAM or the like, are disposed. Here a compact type camera where the camera CAM and the image capturing lens WL are integrated is shown as an example, but the present invention may be applied to a single lens reflex camera where the lens barrel having the image capturing lens WL and the camera body are detachable.

As described above, if the optical system WL1 according to Example 1 is included in the digital still camera CAM as the image capturing lens WL, a camera where the lens barrel can collapse into the camera when the camera is not used, but can still be compact and have a wide angle of view and large aperture, can be implemented.

To assist in understanding the invention, the invention was described using the configuration requirements in the embodiments, but needless to say, the present invention is not limited to these embodiments.

EXPLANATION OF NUMERALS AND CHARACTERS

WL1 to WL5 optical system according to Embodiment 1
WL6 to WL8 optical system according to Embodiment 2
G1 first lens group
G2 second lens group
G3 third lens group
L11 first negative lens (constituting first lens group)
L12 second negative lens (constituting first lens group)
L13 third lens (constituting first lens group)
FS flare-cut stop
S aperture stop
FL filter group
I image plane
CAM digital still camera (optical apparatus)

The invention claimed is:

1. An optical system, comprising, in order from an object:
a first lens group having negative refractive power; and
a second lens group,
the first lens group including, in order from the object, a first negative lens and a second negative lens having a concave surface facing the object, and
the following conditional expressions being satisfied:

$$7.94 \leq (-fn12)/f < 48.00$$

$$2.55 < (-R21)/R12$$

where fn12 denotes a focal length of the second negative lens, f denotes a focal length of the entire optical system, R21 denotes a radius of curvature of the object side surface of the second negative lens, R12 denotes a radius of curvature of an image side surface of the first negative lens, and the radii of curvatures R21 and R12 are positive when the convex surface faces the object,
wherein the second lens group comprises three lens components, each lens component being constituted by one of a non-cemented single lens and a cemented lens having plural lenses cemented together,
wherein the three lens components include two cemented lenses, and
wherein the two cemented lenses include, in order from the object:
a first cemented lens having, in order from the object, a biconvex positive lens and a biconcave negative lens, and
a second cemented lens having, in order from the object, a biconcave negative lens and a biconvex positive lens.

2. A method for manufacturing an optical system having, in order from an object, a first lens group having negative refractive power and a second lens group, the method comprising:

constructing the first lens group so as to include, in order from the object, a first negative lens and a second negative lens having a concave surface facing the object; and
assembling each lens group in a lens barrel such that the following conditional expressions are satisfied:

$$7.94 \leq (-fn12)/f < 48.00$$

$$2.55 < (-R21)/R12$$

where fn12 denotes a focal length of the second negative lens, f denotes a focal length of the entire optical system, R21 denotes a radius of curvature of the object side surface of the second negative lens, R12 denotes a radius of curvature of an image side surface of the first negative lens, and the radii of curvatures R21 and R12 are positive when the convex surface faces the object,
wherein the second lens group is constructed so as to include three lens components, each lens component being constituted by one of a non-cemented single lens and a cemented lens having plural lenses cemented together
wherein the three lens components include two cemented lenses, and
wherein the two cemented lenses include, in order from the object:
a first cemented lens having, in order from the object, a biconvex positive lens and a biconcave negative lens, and
a second cemented lens having, in order from the object, a biconcave negative lens and a biconvex positive lens.

3. An optical system, comprising in order from an object:
a first lens group having negative refractive power; and
a second lens group,
the first lens group including, in order from the object, a first lens having negative refractive power, a second lens which has a concave surface facing the object and has negative refractive power, and a third lens, and
the following conditional expressions being satisfied:

$$-23.0 < vd3 - vd2 < 24.2$$

$$2.55 < (-R21)/R12$$

where vd3 denotes an Abbe number of the third lens with respect to d-line, vd2 denotes an Abbe number of the second lens with respect to d-line, R21 denotes a radius of curvature of the object side surface of the second lens, R12 denotes a radius of curvature of an image side surface of the first lens, and the radii of curvatures R21 and R12 are positive when the convex surface faces the object,
wherein the second lens group comprises three lens components, each lens component being constituted by one of a non-cemented single lens and a cemented lens having plural lenses cemented together,
wherein the three lens components include two cemented lenses, and
wherein the two cemented lenses include, in order from the object:
a first cemented lens having, in order from the object, a biconvex positive lens and a biconcave negative lens, and
a second cemented lens having, in order from the object, a biconcave negative lens and a biconvex positive lens.

4. A method for manufacturing an optical system having, in order from an object, a first lens group having negative refractive power and a second lens group, the method comprising:

constructing the first lens group so as to include, in order from the object, a first lens having negative refractive power, a second lens which has a concave surface facing the object and has negative refractive power, and a third lens; and assembling each lens group in a lens barrel such that the following conditional expressions are satisfied:

$-23.0 < vd3 - vd2 < 24.2$ $2.55 < (-R21)/R12$ where vd3 denotes an Abbe number of the third lens with respect to d-line, vd2 denotes an Abbe number of the second lens with respect to d-line, R21 denotes a radius of curvature of the object side surface of the second lens, R12 denotes a radius of curvature of an image side surface of the first lens, and the radii of curvatures R21 and R12 are positive when the convex surface faces the object, wherein the second lens group is constructed so as to include three lens components, each lens component being constituted by one of a non-cemented single lens and a cemented lens having plural lenses cemented together, wherein the three lens components include two cemented lenses, and wherein the two cemented lenses include, in order from the object:

a first cemented lens having, in order from the object, a biconvex positive lens and a biconcave negative lens, and a second cemented lens having, in order from the object, a biconcave negative lens and a biconvex positive lens.

* * * * *